United States Patent
Fidler et al.

(10) Patent No.: US 9,689,551 B2
(45) Date of Patent: Jun. 27, 2017

(54) DISPLAY DEVICE WITH MOVEMENT ELEMENTS FOR OBTAINING A HIGH RESOLUTION AND/OR A 3D EFFECT

(75) Inventors: Franz Fidler, Vienna (AT); Joerg Reitterer, Vienna (AT); Alexander Swatek, St. Michael (AT)

(73) Assignee: TriLite Technologies GmbH, Vienna (AT)

(*) Notice: Subject to any disclaimer, the term of this patent is extended or adjusted under 35 U.S.C. 154(b) by 582 days.

(21) Appl. No.: 14/001,352

(22) PCT Filed: Feb. 23, 2012

(86) PCT No.: PCT/EP2012/053055
§ 371 (c)(1),
(2), (4) Date: Aug. 23, 2013

(87) PCT Pub. No.: WO2012/113856
PCT Pub. Date: Aug. 30, 2012

(65) Prior Publication Data
US 2013/0329021 A1  Dec. 12, 2013

(30) Foreign Application Priority Data

Feb. 25, 2011  (AT) .................................. A 258/2011
Nov. 24, 2011  (AT) ................................. A 1738/2011

(51) Int. Cl.
*G09G 3/36* (2006.01)
*G09G 3/20* (2006.01)
(Continued)

(52) U.S. Cl.
CPC ................ *F21V 5/04* (2013.01); *F21K 99/00* (2013.01); *F21V 13/04* (2013.01); *F21V 29/70* (2015.01);
(Continued)

(58) Field of Classification Search
CPC ...... G02B 27/2214; G09G 3/003; G09G 5/14; G09G 2354/00
See application file for complete search history.

(56) References Cited

U.S. PATENT DOCUMENTS 5,170,180 A   12/1992  Doi
5,666,226 A    9/1997  Ezra et al.
(Continued)

FOREIGN PATENT DOCUMENTS

EP   0627861 A1   5/1994
EP   0805429 A1   5/1997
(Continued)

OTHER PUBLICATIONS

Second Office Action received for Japanese Patent Application No. 2013-554901, mailed on Feb. 9, 2015, 4 pages of Japanese Office action and 5 pages of English translation.
(Continued)

*Primary Examiner* — Alexander Eisen
*Assistant Examiner* — Nan-Ying Yang
(74) *Attorney, Agent, or Firm* — Fiala & Weaver P.L.L.C.

(57) ABSTRACT

A display device (A) for the display of image information, which consists of at least one or a plurality of picture elements and may be modified by means of a frame rate (R), having at least one light source (L) for the generation of a picture element of the image information, characterized in that there are provided picture element modification means (VM) having movement elements (BR, BV, LI, L), which are movably arranged with at least the frame rate (R) in the display device (A) and which are adapted to selectively deflect and/or cover the light emitted by the at least one light source (L) for the viewer (LA, RA) of the display device (A) in order to generate per light source (L) of the display device (A) at least twice the number of picture elements as exten-
(Continued)

sion picture elements (1, 2, 3, 4, 5, 6) for the display of the image information, wherein the light emitted by the at least one light source (L) is modified with at least twice the frame rate (R) as light source frequency ($f_L$).

19 Claims, 21 Drawing Sheets

(51) Int. Cl.
| | | |
|---|---|---|
| G09G 5/10 | (2006.01) | |
| F21V 5/04 | (2006.01) | |
| G02B 26/04 | (2006.01) | |
| G02B 26/08 | (2006.01) | |
| G02B 27/22 | (2006.01) | |
| G09G 3/00 | (2006.01) | |
| H04N 13/04 | (2006.01) | |
| F21K 99/00 | (2016.01) | |
| F21V 13/04 | (2006.01) | |
| F21V 29/70 | (2015.01) | |
| G09G 3/34 | (2006.01) | |
| B60Q 1/14 | (2006.01) | |
| B60Q 1/44 | (2006.01) | |

(52) U.S. Cl.
CPC ......... *G02B 26/04* (2013.01); *G02B 26/0808* (2013.01); *G02B 26/0816* (2013.01); *G02B 27/225* (2013.01); *G02B 27/2235* (2013.01); *G09G 3/001* (2013.01); *G09G 3/003* (2013.01); *G09G 3/007* (2013.01); *H04N 13/042* (2013.01); *H04N 13/045* (2013.01); *H04N 13/0418* (2013.01); *H04N 13/0422* (2013.01); *B60Q 1/143* (2013.01); *B60Q 1/44* (2013.01); *B60Q 2300/056* (2013.01); *G09G 3/3426* (2013.01); *G09G 2340/0407* (2013.01); *G09G 2360/141* (2013.01); *G09G 2360/145* (2013.01); *H04N 13/0468* (2013.01); *H04N 13/0486* (2013.01); *H04N 2013/0463* (2013.01)

(56) References Cited

U.S. PATENT DOCUMENTS

| | | | |
|---|---|---|---|
| 6,097,508 A | 8/2000 | Hattori | |
| 6,204,832 B1 | 3/2001 | Melville et al. | |
| 6,381,057 B1* | 4/2002 | Itabashi | G02B 26/123 |
| | | | 347/243 |
| 6,971,748 B2 | 12/2005 | Cho et al. | |
| 2002/0159268 A1 | 10/2002 | Naganawa | |
| 2002/0159489 A1 | 10/2002 | Wolak et al. | |
| 2002/0190922 A1 | 12/2002 | Tsao | |
| 2003/0133060 A1* | 7/2003 | Shimada | G02B 27/283 |
| | | | 349/113 |
| 2004/0041784 A1* | 3/2004 | Cho | G02B 5/045 |
| | | | 345/102 |
| 2004/0052076 A1 | 3/2004 | Mueller et al. | |
| 2004/0151466 A1 | 8/2004 | Crossman-Bossworth et al. | |
| 2005/0030301 A1 | 2/2005 | Harrold et al. | |
| 2005/0225833 A1 | 10/2005 | Marshall | |
| 2006/0013593 A1* | 1/2006 | Yokoo | G02F 1/035 |
| | | | 398/152 |
| 2006/0056855 A1 | 3/2006 | Nakagawa et al. | |
| 2006/0133104 A1 | 6/2006 | Okubo et al. | |
| 2006/0203339 A1 | 9/2006 | Kleinberger et al. | |
| 2006/0262243 A1 | 11/2006 | Lester et al. | |
| 2006/2622243 | 11/2006 | Lester et al. | |
| 2007/0116079 A1* | 5/2007 | Giniunas | G02B 27/0961 |
| | | | 372/69 |
| 2007/0145915 A1 | 6/2007 | Roberge et al. | |
| 2007/0177250 A1 | 8/2007 | Duncan | |
| 2007/0206258 A1 | 9/2007 | Malyak et al. | |
| 2009/0046474 A1 | 2/2009 | Sato et al. | |
| 2009/0059334 A1* | 3/2009 | Lin | H04N 9/3129 |
| | | | 359/198.1 |
| 2010/0157026 A1* | 6/2010 | Reichelt | G02B 26/005 |
| | | | 348/51 |
| 2010/0259604 A1* | 10/2010 | Surman | G02B 27/225 |
| | | | 348/54 |
| 2010/0315597 A1 | 12/2010 | Powell et al. | |
| 2013/0327966 A1 | 12/2013 | Fidler et al. | |

FOREIGN PATENT DOCUMENTS

| | | |
|---|---|---|
| EP | 1388840 A2 | 2/2004 |
| JP | 1-235917 A | 9/1989 |
| JP | 10149430 A | 6/1998 |
| JP | 11305159 A | 11/1999 |
| JP | 2000314844 A | 11/2000 |
| JP | 2003149577 A | 5/2003 |
| JP | 2003315721 A | 11/2003 |
| JP | 2004-302121 A | 10/2004 |
| JP | 2005-84530 A | 3/2005 |
| JP | 2005327823 A | 11/2005 |
| JP | 2006-184447 A | 7/2006 |
| JP | 2007-25601 A | 2/2007 |
| JP | 2007-207126 A | 8/2007 |
| JP | 2007-209594 A | 8/2007 |
| JP | 2009-211388 A | 9/2009 |
| JP | 2010-276959 A | 12/2010 |
| JP | 2012-113192 A | 6/2012 |
| WO | 2005/083494 A1 | 9/2005 |

OTHER PUBLICATIONS

Office Action for Austrian Application A 258/2011, dated Dec. 22, 2011. 3 pages.
International Preliminary Report on Patentability for International Application No. PCT/EP2012/053055, dated May 24, 2013. 13 pages.
International Search Report for International Application No. PCT/EP2012/053055, dated May 9, 2012. 3 pages.
International Search Report for International Application No. PCT/EP2012/053101, dated Aug. 28, 3012. 9 pages.
Written Opinion of the International Searching Authority for International Application No. PCT/EP2012/053055, dated May 9, 2012. 6 pages.
Written Opinion of the International Searching Authority for International Application No. PCT/EP2012/053101, dated Aug. 28, 2012. 13 pages.
Office Action received for Japanese Patent Application No. 2013-554901, dispatch on Jun. 16, 2014, 5 pages of English translation only.
Office Action received for Japanese Patent Application No. 2013-554891, mailed on Sep. 1, 2014, 4 pages (English Translation only).
Communication Pursuant to Article 94(3) EPC received for European Patent Application No. 12706808.8, mailed on Sep. 29, 2015, 8 pages.
Communication Pursuant to Article 94(3) EPC received for European Patent Application No. 12707062.1, mailed on Sep. 29, 2015, 8 pages.
Meister, Darryl, "Chromatic Aberration", Online Available at <http://www.opticampus.com/popcourse.php?url=chromatic aberration/>, retrieved on Sep. 15, 2015, 8 pages.

* cited by examiner

DISPLAY DEVICE WITH MOVEMENT ELEMENTS FOR OBTAINING A HIGH RESOLUTION AND/OR A 3D EFFECT

This application is a U.S. national phase of International Application No. PCT/EP2012/053055 filed Feb. 23, 2012, which designated the U.S. and claims priority to Austrian Application No. A 258/2011, filed on Feb. 25, 2011, and to Austrian Application No. A 1738/2011, filed on Nov. 24, 2011, all of which are incorporated by reference herein in their entireties.

The invention relates to a display device for the display of image information consisting of a plurality of picture elements and which may be modified by means of a frame rate, having at least one light source for the generation of a picture element of the image information.

The document WO 2010/146070 discloses such a display device, which is configured as a foldable LED video screen. The known display device comprises a plurality of LEDs as light sources, which are controlled as control means by an electronic system and by means of which image information, such as, e.g., a motion picture or a still image, may be displayed.

In the special field of LED video screens, pixel distances of at least $d_{LED}=3$ mm ($d_{LED}=6$ mm in outside conditions) are state of the art due to technological reasons Smaller pixel distances are not possible because of technological restrictions (construction size, temperature problem etc.) and high costs. In correlation with the size of the screen, this leads to lower resolutions than those that are possible nowadays using other technologies (LCD, plasma). High resolution is desired in order to being able to implement applications such as HDTV or 3D television without special additional glasses (autostereoscopy) on a satisfying quality level.

In order to obtain a respective increase of resolution, it could be possible to aim at a further decrease of the pixel distance and a reduction in size of the LED pixels. This approach, however, has the disadvantage that the costs would be significantly increased. Further, there arises, due to the LED pixels that are arranged in a closer distance to each other, a temperature problem, which is why only a reduced light power of the LEDs and, hence, lower brightness of the LED video screen is possible.

In regard to 3D television with autostereoscopy, it is state of the art to use two picture elements (pixels) (one for the left eye, and one for the right eye) in order to display a picture element of the image information of a 3D image. This spatial multiplex method reduces the resolution that is present due to the number of pixels by at least factor 2, which has an adverse effect.

It is an objective of the invention to provide a display device, which avoids above referred disadvantages. According to the invention, this task is solved by a display device wherein per picture element there are provided picture element modification means having movement elements, which are movably arranged with at least the frame rate in the display device and which are adapted to selectively deflect and/or cover the light emitted by the at least one light source for the viewer of the display device in order to generate per light source of the display device at least twice the number of picture elements as extension picture elements for the display of the image information, wherein the light emitted by the at least one light source is modified with at least twice the frame rate as light source frequency.

In display devices according to the state of the art, reflectors are fixedly attached behind the light sources (consisting, e.g., of a red, a green and a blue LED per picture element) in order to increase the light yield per picture element and, hence, the light yield of the entire display device. According to the invention, picture element modification means with movable or partially movable elements, this is reflecting mirrors or reflectors, respectively, in combination with lenses, shutters as well as apertures, are used together with the light sources in order to deflect the emitted light in a time multiplex method into different directions. Which image information is emitted into which direction at a determined point of time, depends on color and brightness information at this point of time sent to the respective light source and on the position of the picture element modification means at this point of time. A picture element modification means herein consists of at least one movement element and may in addition also have immovable elements for deflecting and/or covering and/or focusing the beams. By the measures according to the invention there is obtained the advantage that the resolution of the display device may be increased, without having to increase the number of light sources (e.g., LEDs) or reduce their distance to each other, respectively.

The image information of autostereoscopic 3D images may be deflected with the aid of movement elements also in time multiplex within the duration of the frame rate period once in the direction of the right eye and then in the direction of the left eye. By way of a suitable determination of the picture element modification means it is possible to generate a sufficiently focused spatial intensity distribution in the far field of the light sources, which allows for a spatial separation of the image information for the left and the right eye. In this way, there may advantageously be obtained a 3D effect, without having to wear special glasses.

Further advantageous embodiments of display devices according to the invention and inventive light sources are explained in greater detail in the following by way of the figures.

FIG. 2 shows the sequential control of the extension picture elements of FIG. 1a.

Figure 12:
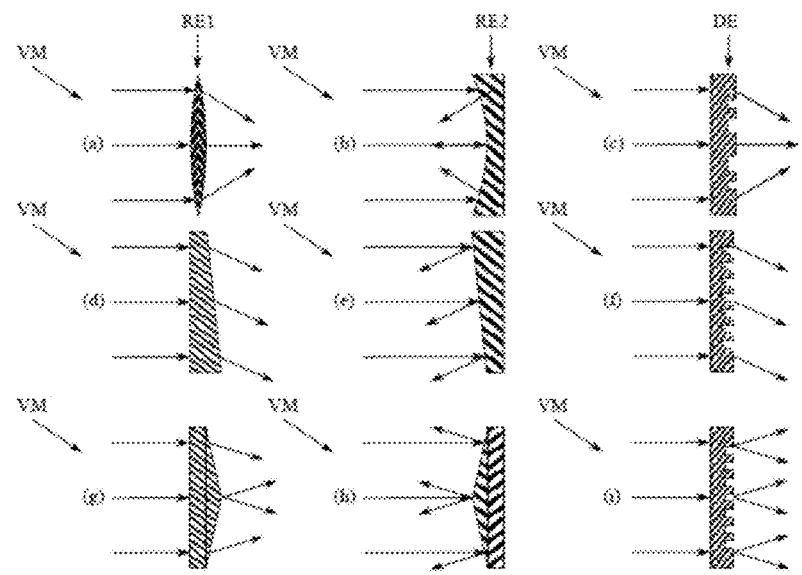

In FIG. 12 the mechanisms of action of refractive elements, reflective elements and diffractive elements are illustrated.

Figure 13:
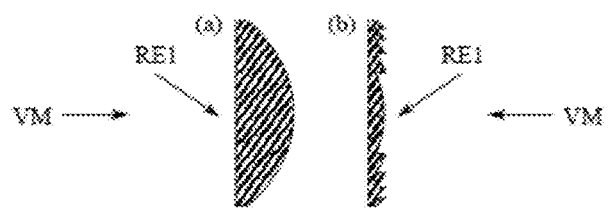

In FIG. 13 there are illustrated two examples of embodiments of refractive elements of the picture element modification means.

Figure 14:
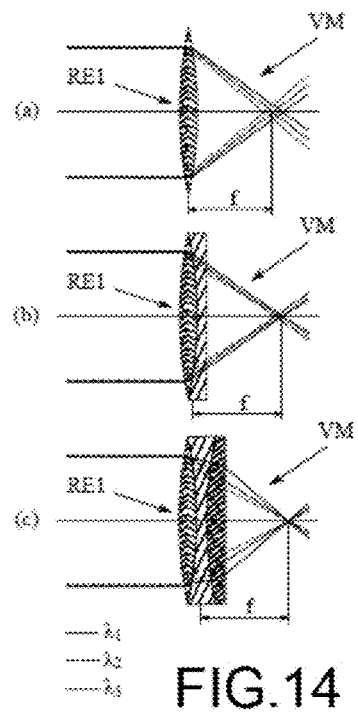

FIG. 14 schematically shows the functioning principle of chromatic, achromatic and apochromatic correction.

Figure 15:
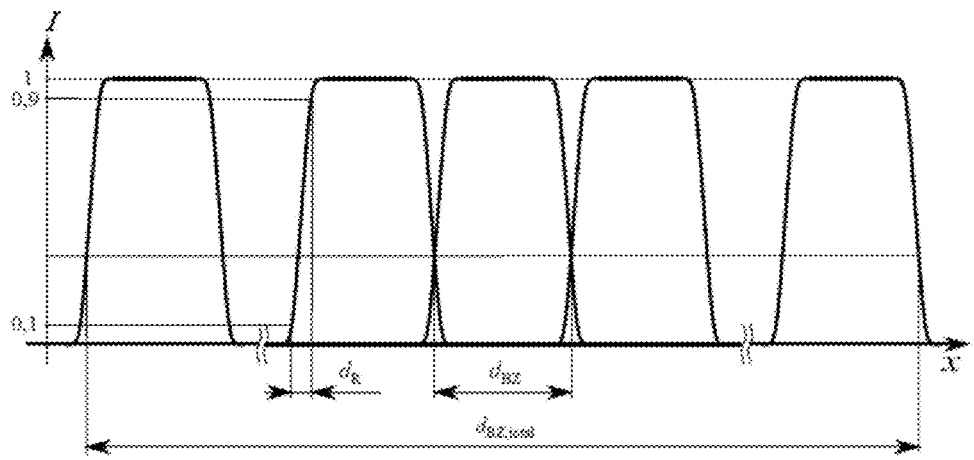

In FIG. 15 there is illustrated the intensity in the far field as a function of the lateral coordinate.

Figure 16:
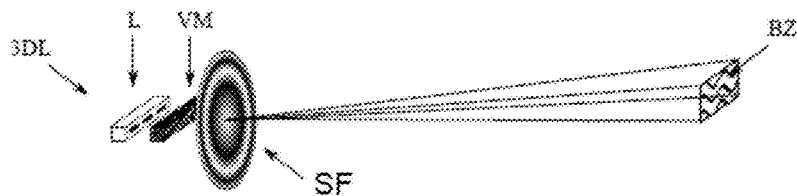

FIG. 16 shows a display device consisting of a light source, picture element modification means as well as a beam shaper.

Figure 17:
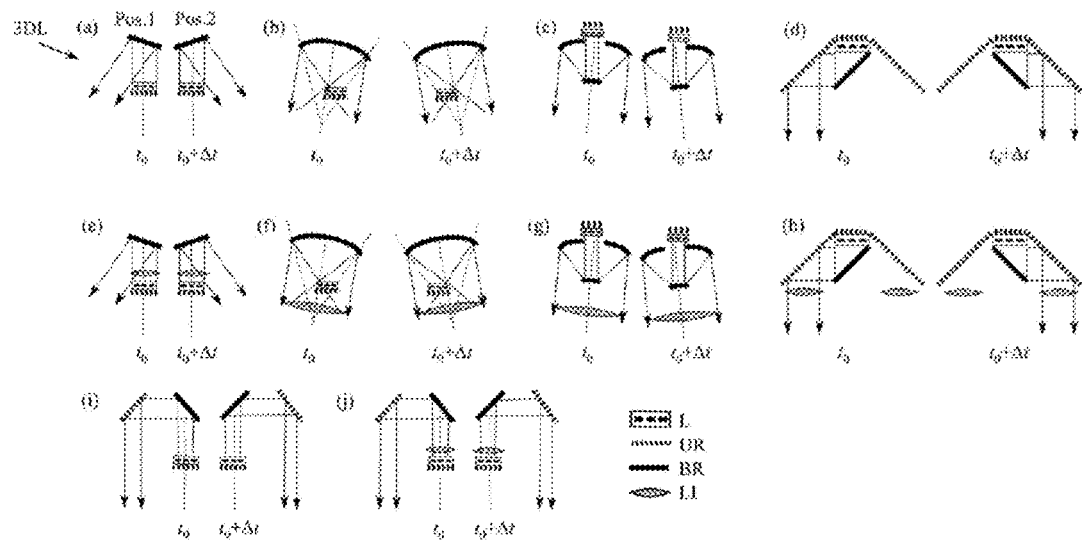

FIG. 17 shows several exemplary embodiments of an immovable light source with movable as well as immovable mirrors and lenses forming picture element modification means.

Figure 18:
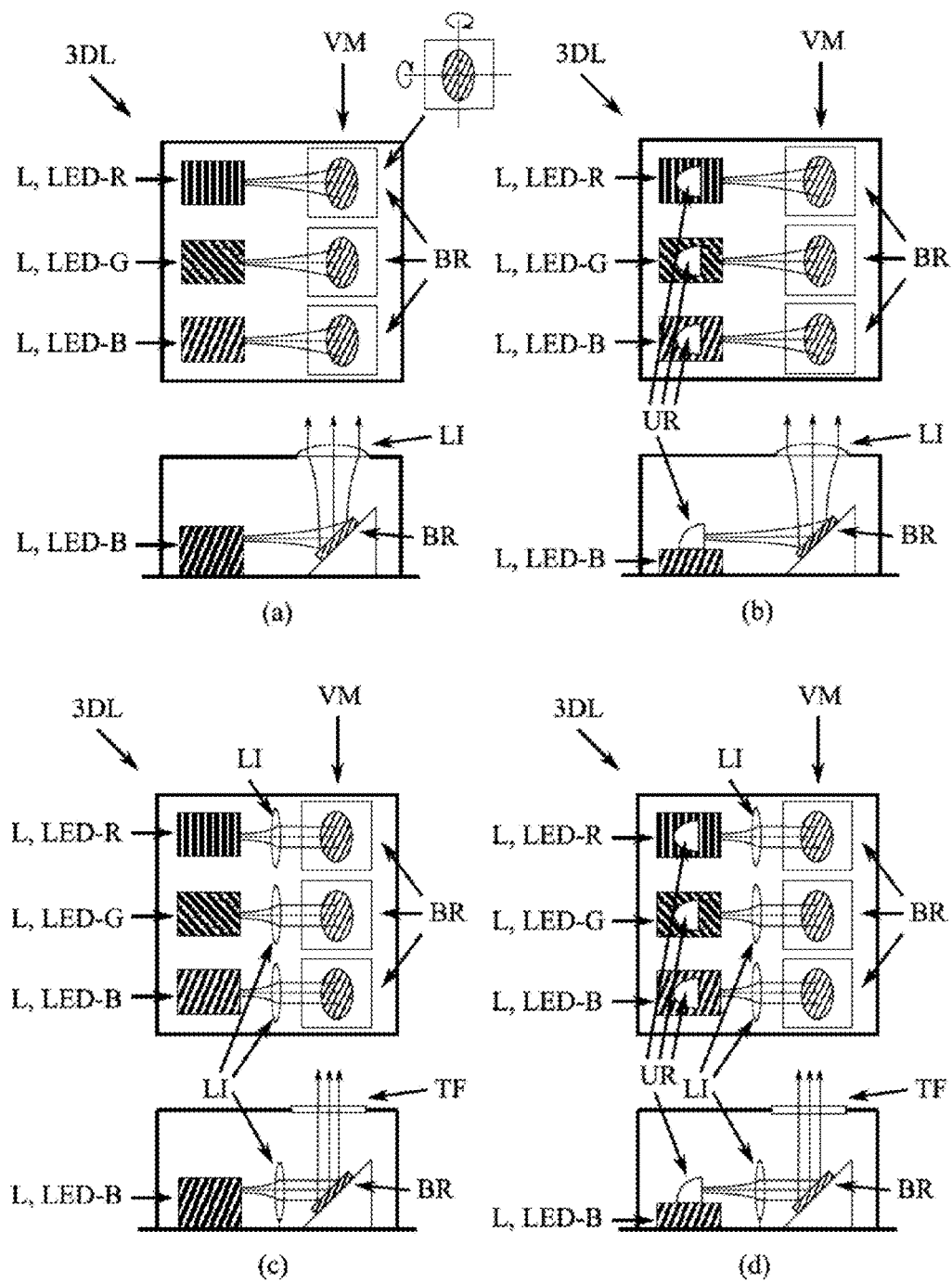

FIG. 18 shows further exemplary embodiments with immovable light sources and movable reflectors as well as immovable lenses.

Figure 19:
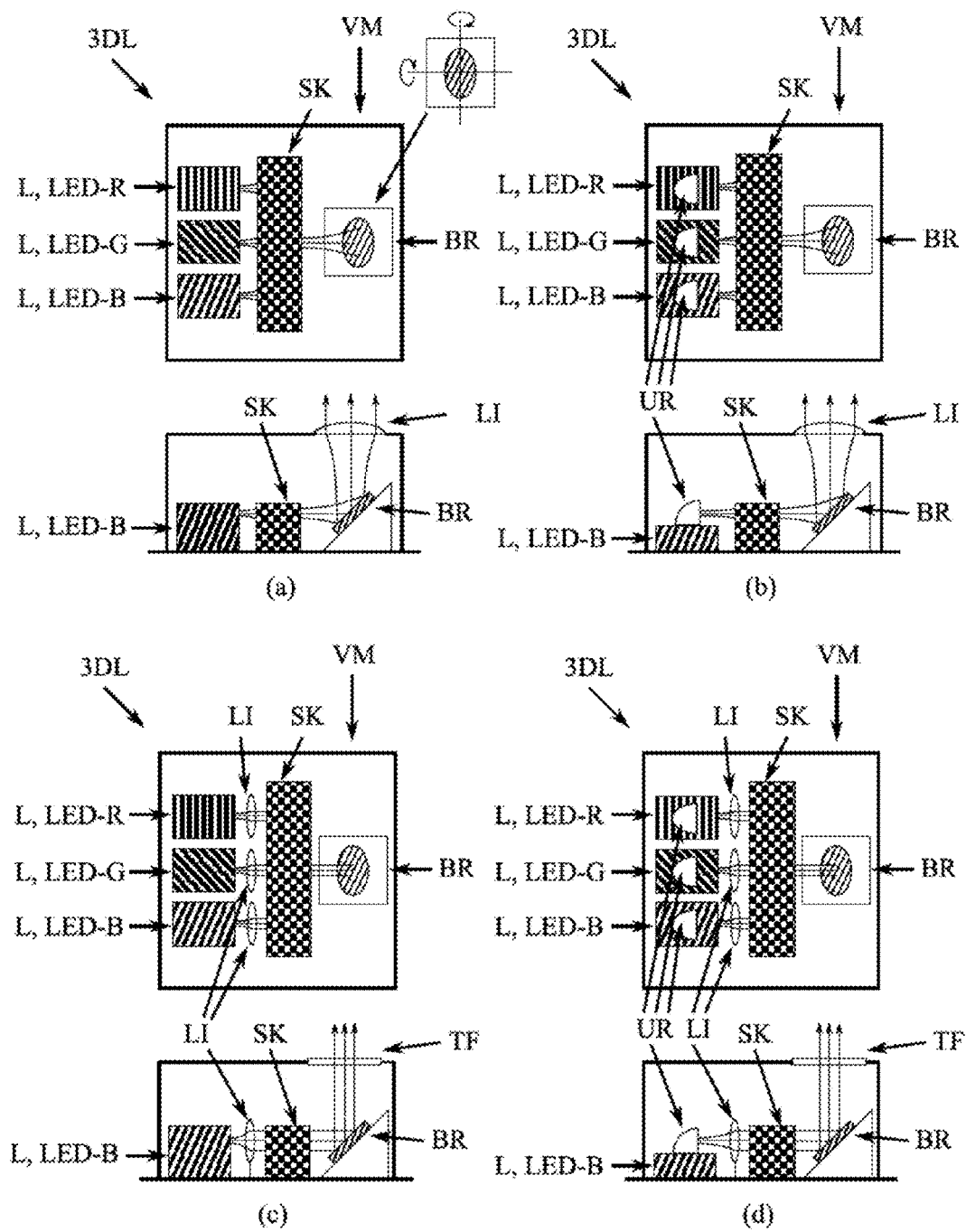

FIG. 19 shows exemplary embodiments of a light source with a beam combiner and a movable reflector as well as immovable lenses.

Figure 20:
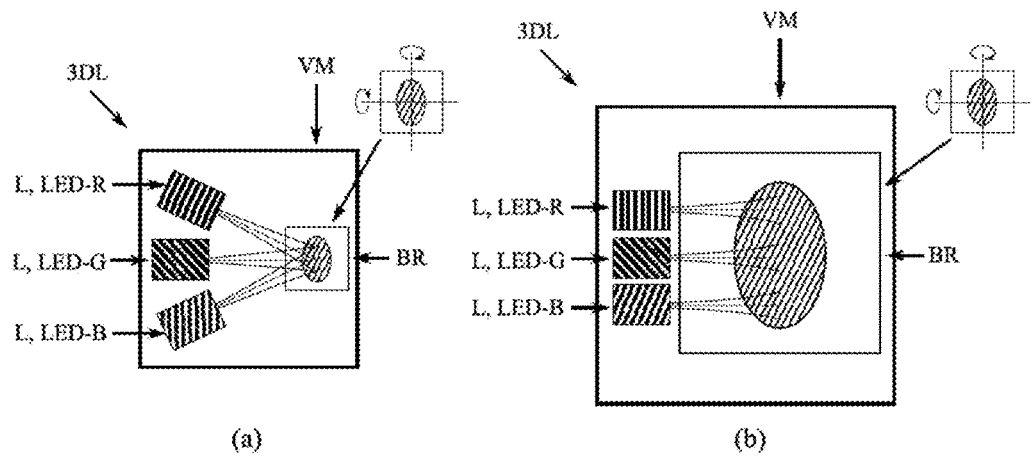

FIG. 20 shows two exemplary embodiments of a light source with a movable reflector without beam combiner.

Figure 21:
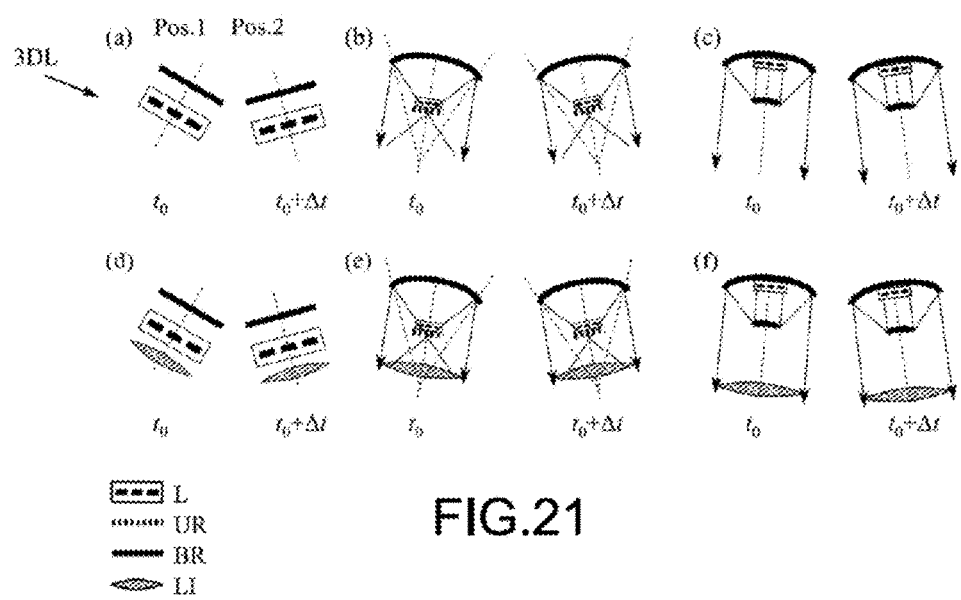

FIG. 21 shows exemplary embodiments, wherein the light source L itself is movably arranged.

Figure 22:
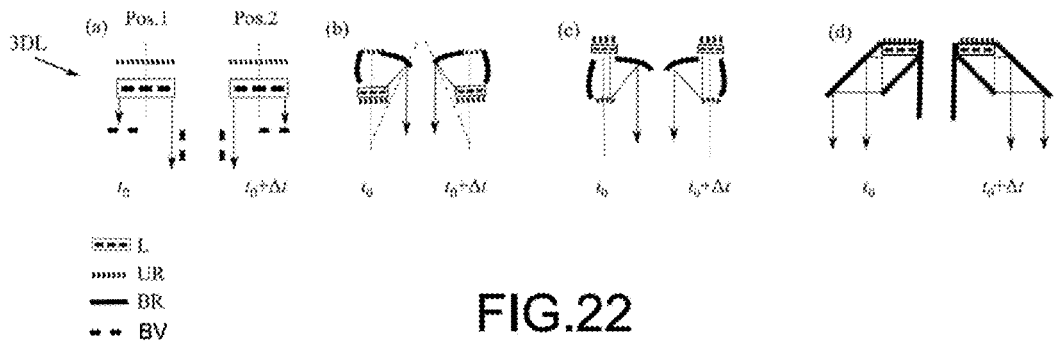

FIG. 22 shows a further possible extension of the concept according to FIG. 17 with micro shutters.

Figure 23:
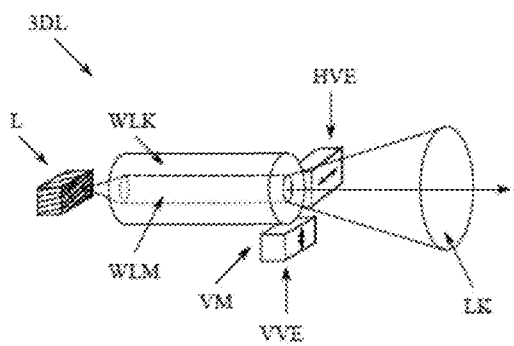

In FIG. 23 a realization with a waveguide and a displacement device is illustrated.

Figure 24:
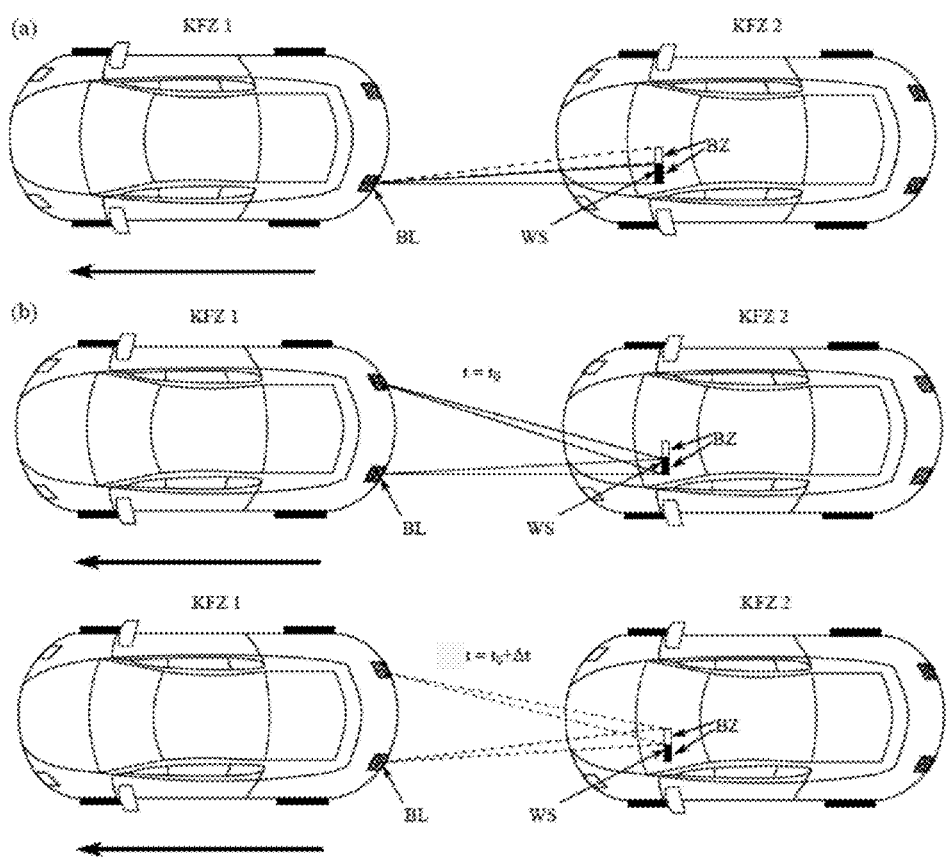

FIG. 24 schematically shows the functioning principle of the 3D breaking light.

Figure 25:
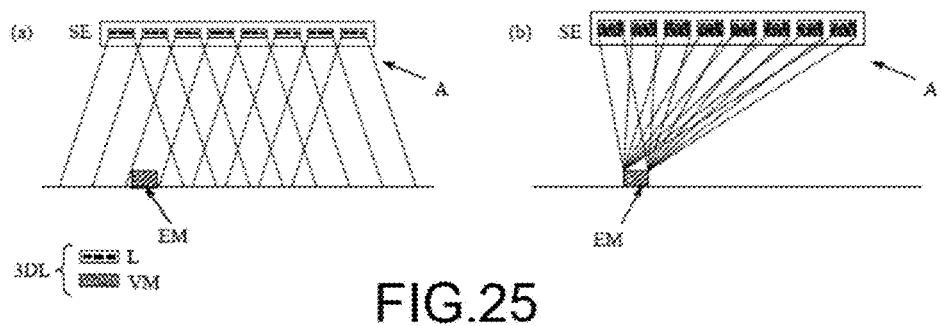

FIG. 25 shows a comparison of conventional and adaptive smart lighting with several picture element modification means.

Figure 26:
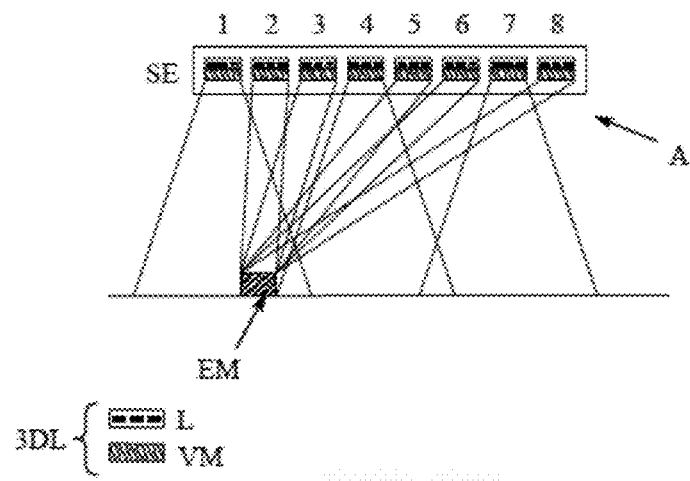

FIG. 26 shows a smart lighting system, wherein individual 3D light sources are used for a homogenous spatial illumination and other 3D light sources, which are focused on the receiver, are used for transferring data.

Figure 27:
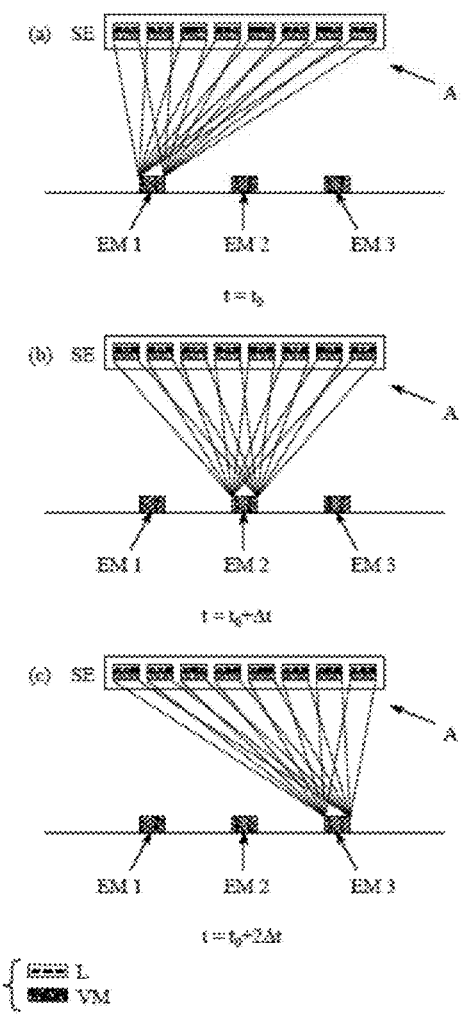

FIG. 27 shows an adaptive smart lighting system with three receivers, which receive data from the transmitter in the time multiplex method.

Figure 28:
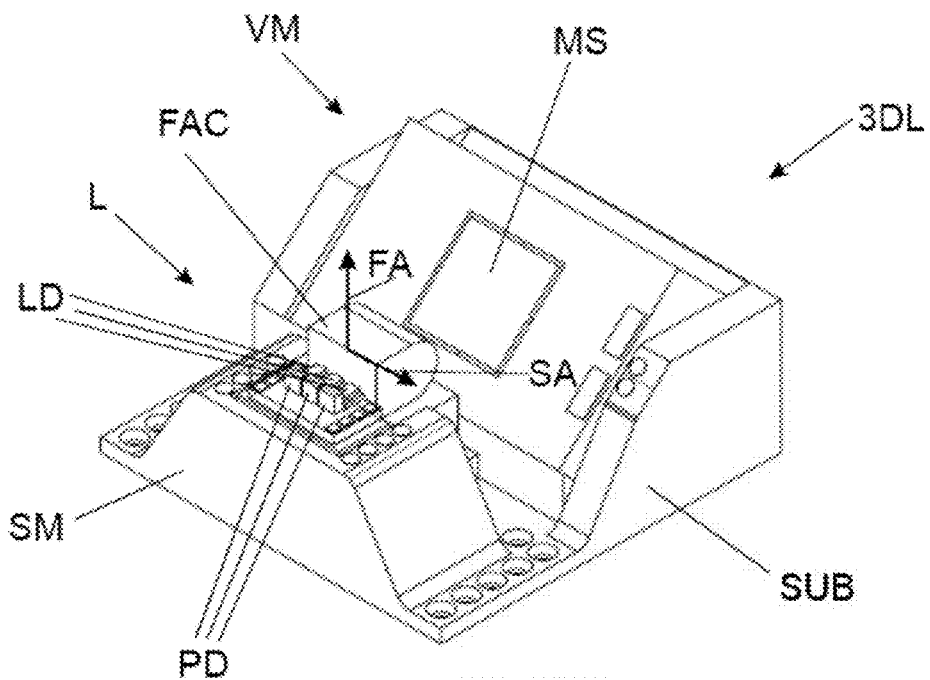

FIG. 28 shows an exemplary embodiment of a 3D light source with three laser diodes.

Figure 29:
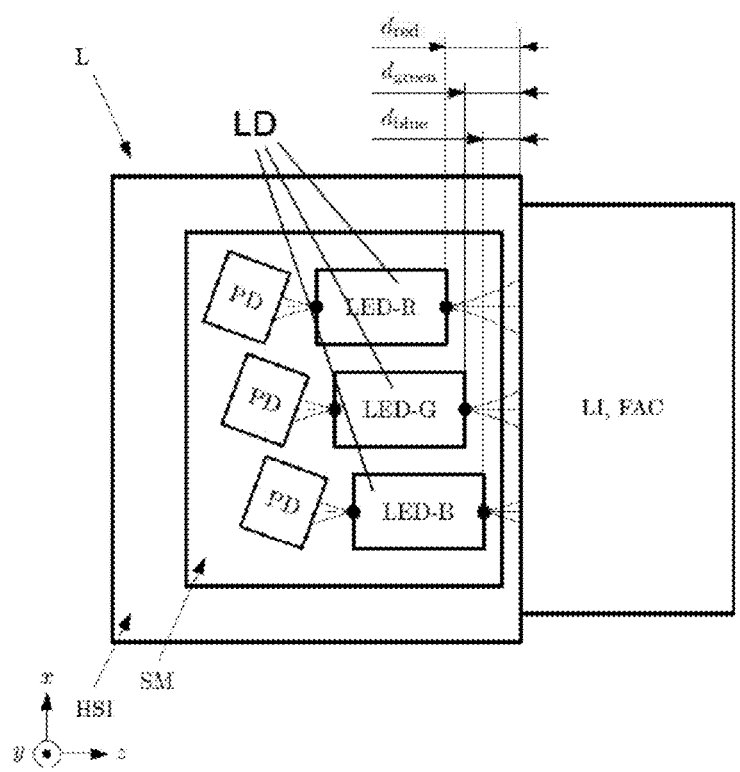

FIG. 29 shows an integrated RGB light source with three laser diodes and photodiodes.

Figure 30:
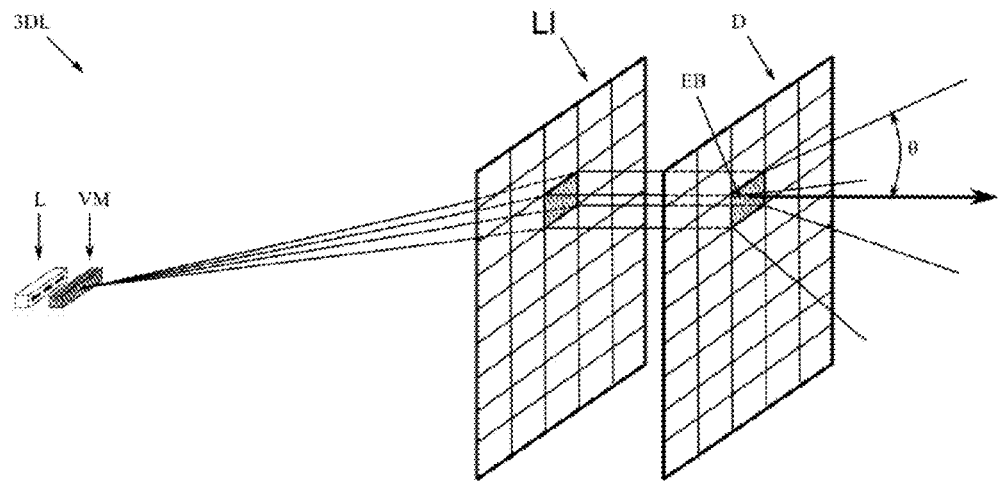

FIG. 30 shows an exemplary embodiment of a 3D light source with increase of resolution.

Figure 31:
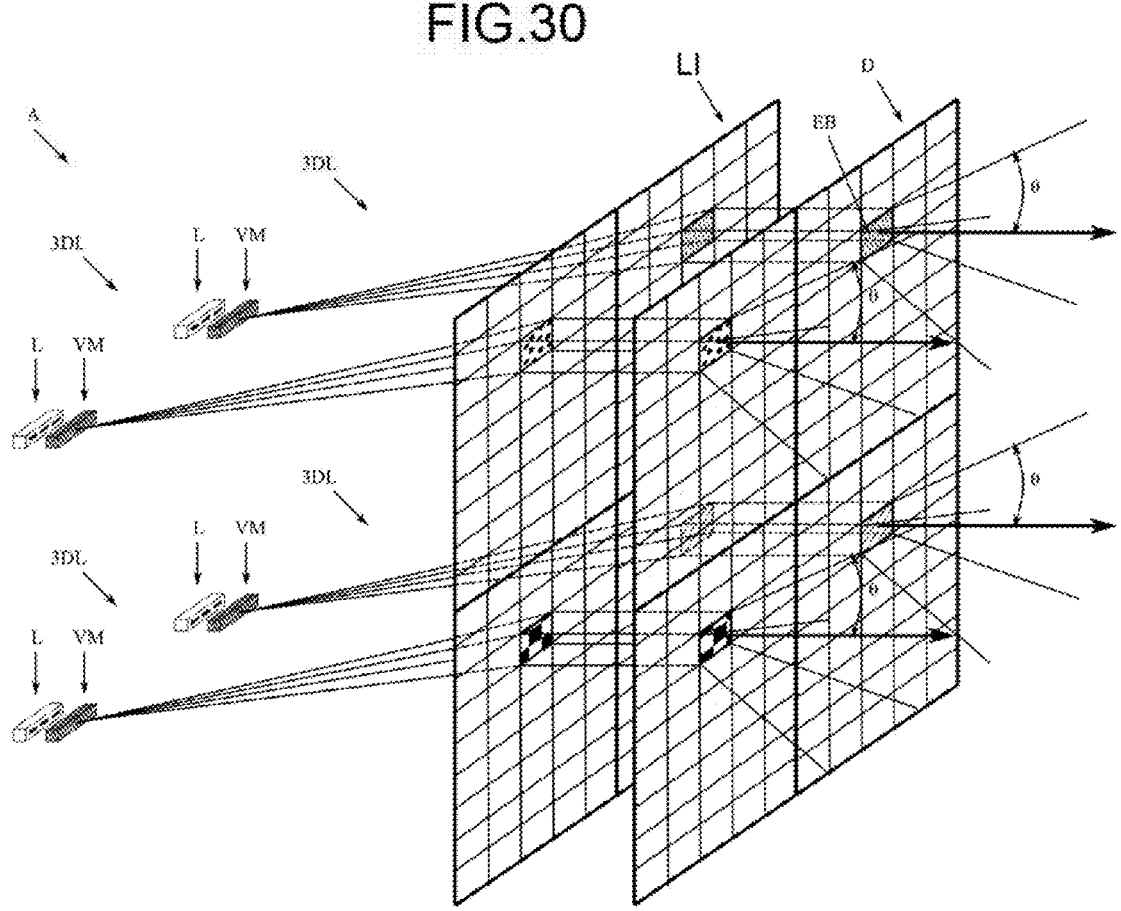

FIG. 31 shows an exemplary embodiment of a display device with four 3D light sources according to FIG. 30.

Figure 32:
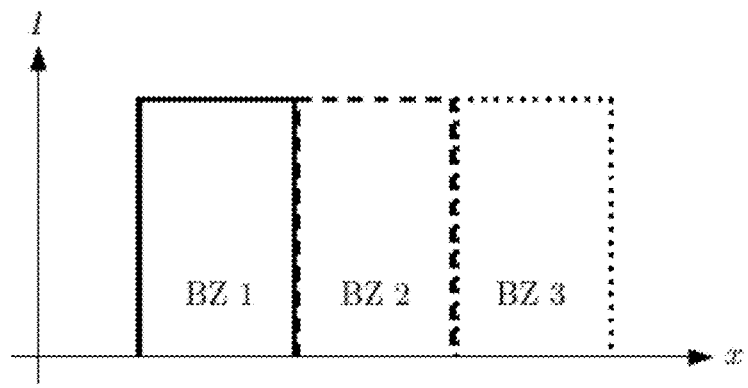

FIG. 32 shows an ideal spatial separation of viewing zones.

Figure 33:
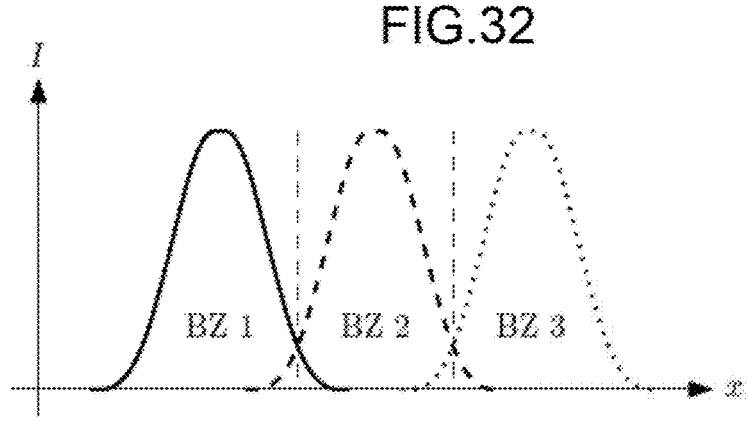

FIG. 33 shows an actually realizable spatial separation of viewing zones.

Figure 34:
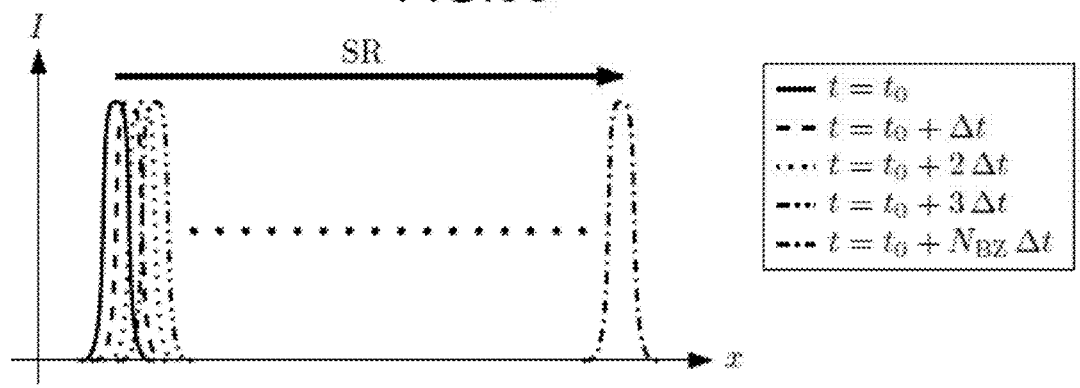

FIG. 34 shows overlapping continuous viewing zones.

Figure 35:
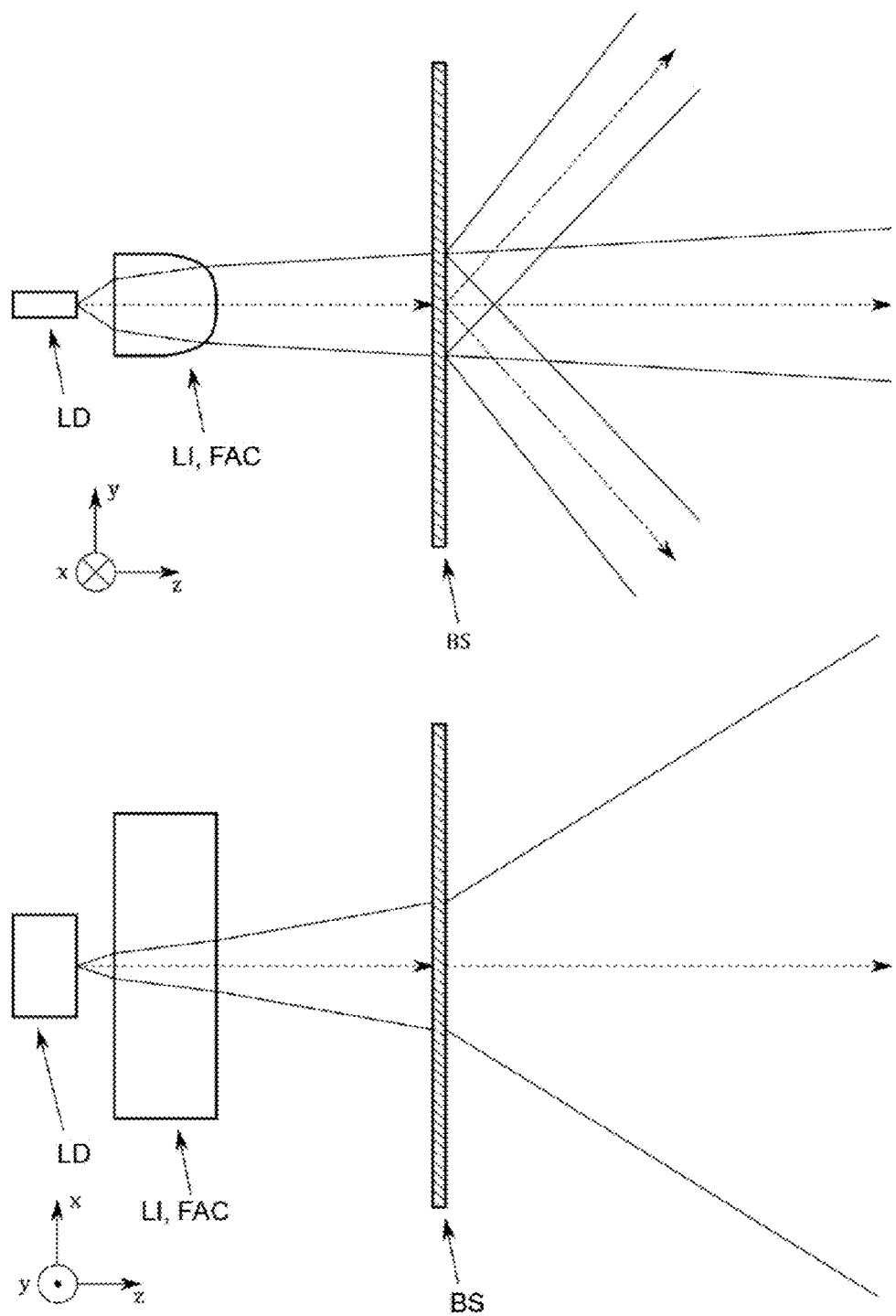

FIG. 35 shows the schematic setup of an optical system with a beam splitter.

Figure 36:
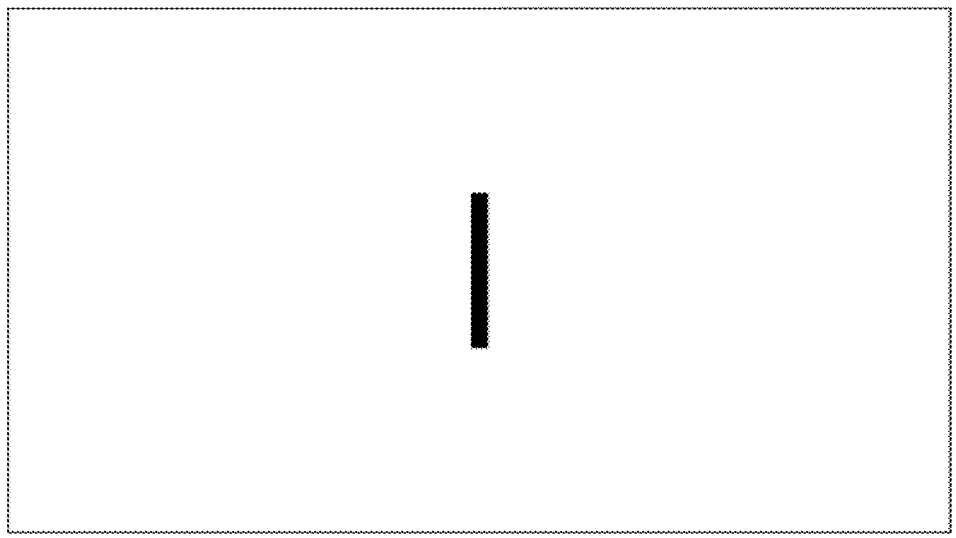
Figure 36:
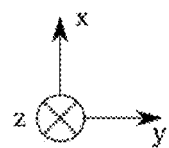
Figure 36:
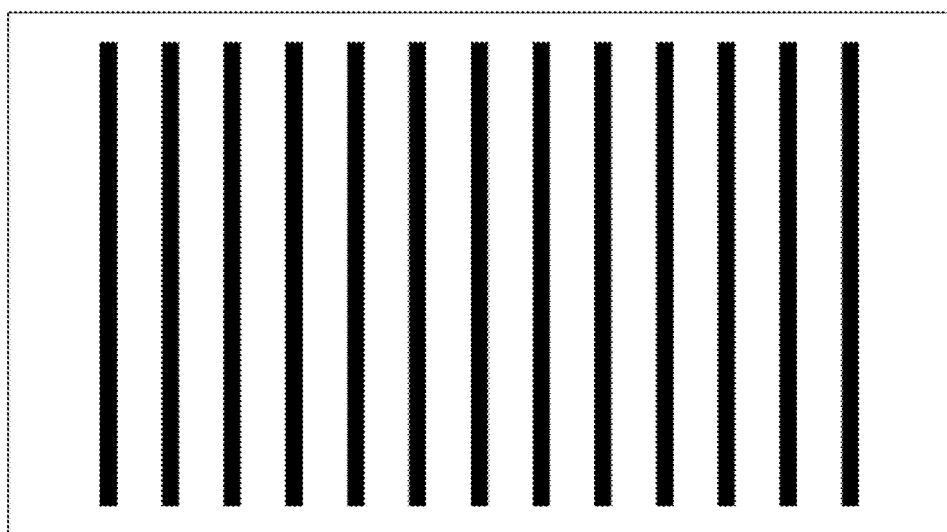
Figure 36:
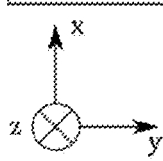

FIG. 36 shows the intensity distribution that may be obtained with the beam splitter in the far field in comparison with that without beam splitter.

Figure 37:
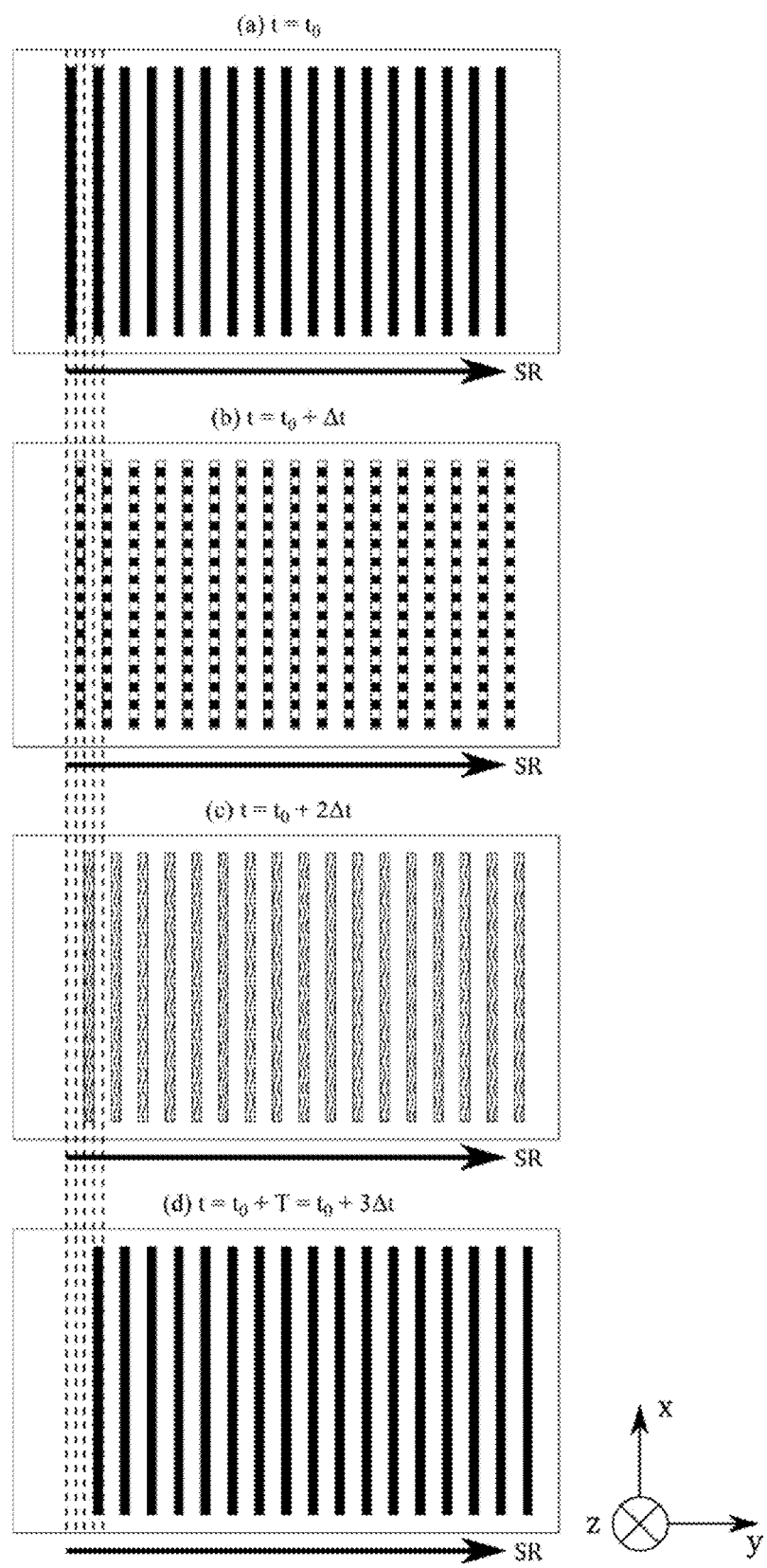

FIG. 37 shows the temporal movement of the intensity distribution of FIG. 36 for the simple application of three different viewing zones.

Figure 38:
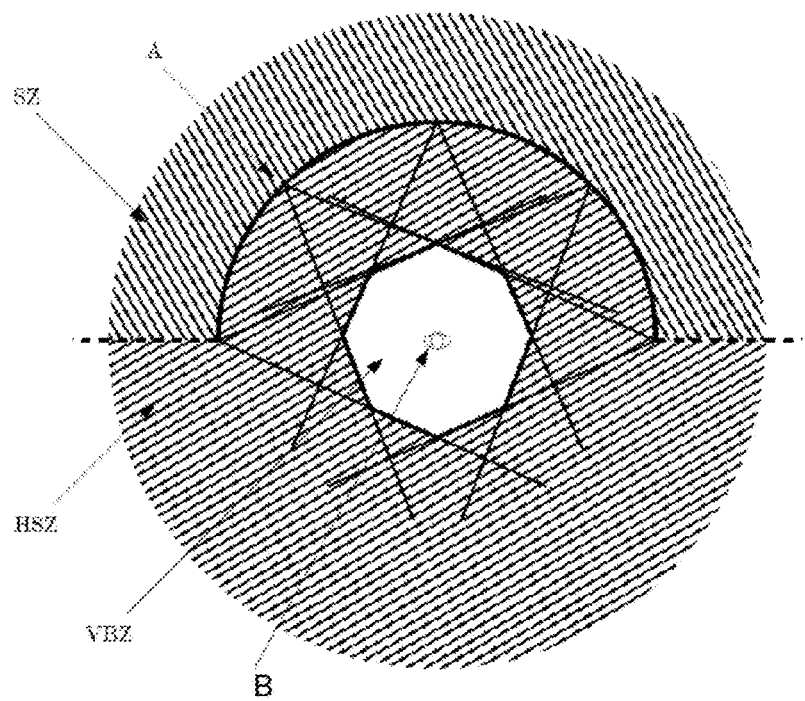

FIG. 38 shows an exemplary embodiment of a display device in the form of a curved autostereoscopic screen.

Figure 39:
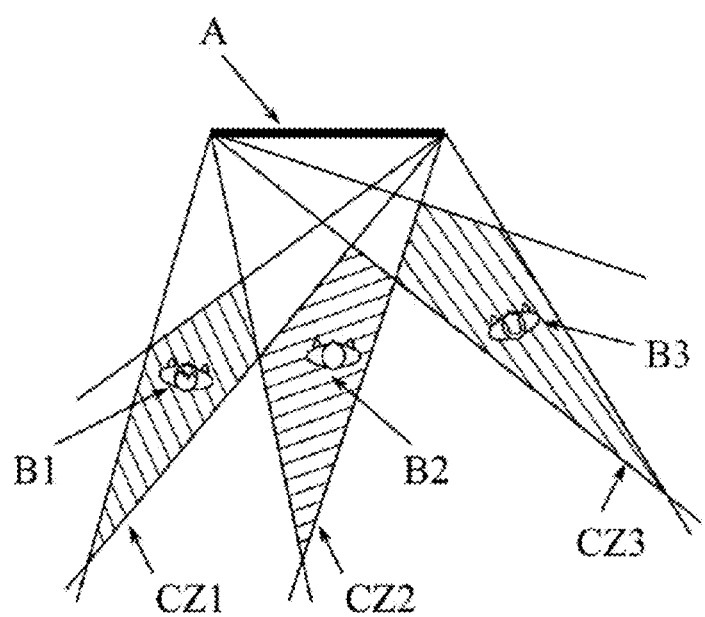

FIG. 39 shows an exemplary embodiment of a display device according to the invention as a multi-content video screen.

DISPLAY DEVICE WITH INCREASED RESOLUTION

In the following description of the invention, the term display device comprises any device for the display of image information for at least one viewer or optical receiver. This includes, in particular, screens, large-scale screens or projectors as well as information boards, room illumination devices, optical communication systems and other arrays of individual picture elements (pixels) for the projection and display of image information, which may be composed of a still image, a motion picture or also only of individual picture elements and/or color/black-white areas. In the following there is made reference only to the elements of the display device that are substantial to the invention, as the expert will be well aware of, for example, elements for electricity supply of a display device or for the decoding of received video image information.

Figure 1:
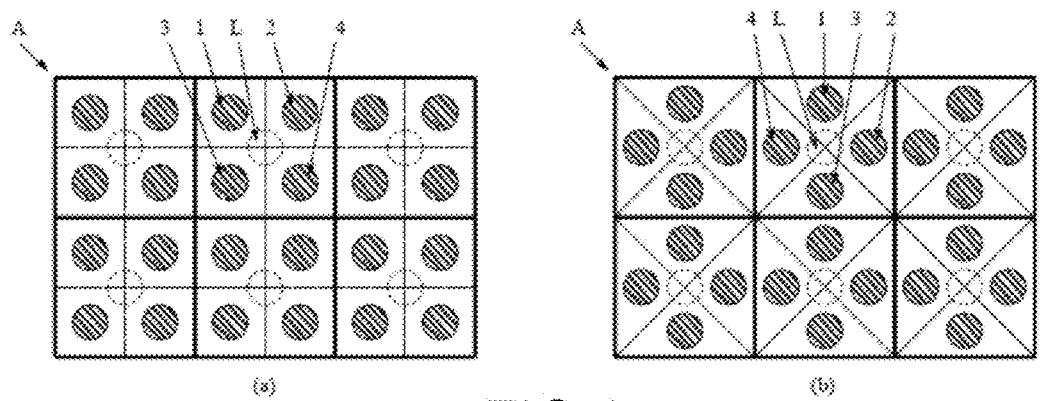
FIG. 1 shows two examples of a display device, wherein the resolution is increased to the fourfold by means of picture element modification means.

FIG. 1(a) shows as an example a display device A, wherein the resolution with picture element modification means is increased to the fourfold of the number of light sources L of the display device A. The image information supplied to the display device A contains four times more picture elements than light sources L of the display device A, which is why according to the state of the art the image information could only be displayed with a fourth of the picture elements contained in the image information or resolution, respectively. The image information of four picture elements is outputted by way of a light source L in connection with a picture element modification means VM, e.g., a movable mirror, with four different positions in the time multiplex method:

1. time $t=t_0$: extension picture element 1→light source L emits image information of the first picture element, and the picture element modification means VM is in position 1.
2. time $t=t_0\Delta t$: extension picture element 2→light source L emits image information of the second picture element, and the picture element modification means VM is in position 2.
3. time $t=t_0+2\Delta t$: extension picture element 3→light source L emits image information of the third picture element, and the picture element modification means VM is in position 3.
4. time $t=t_0+3\Delta t$: extension picture element 4→light source L emits image information of the fourth picture element, and the picture element modification means VM is in position 4.

The time interval herein is $\Delta t=1/(4R)$, wherein R indicates the frame rate and the time interval corresponds to a shift interval, wherein the picture element modification means VM are switched from one position into the next position, which may also be carried out continuously. The light emitted by the light source L, hence, changes with a light source frequency $f_L$ corresponding to the fourfold of the frame rate R in order to output the image information of an extension picture element per time interval. Increasing the resolution to the fourfold, hence, is made possible by the light emitted by the light source L being emitted in the time multiplex method at four sites, this is, the extension picture elements 1 to 4, which are arranged surrounding the light source L. In the case of a square picture element composed of $K_{res}=4$ extension picture elements this means that at the time $t=t_0$ the first picture element of the image information of the video to be displayed by the display device is emitted by the light source L, the light of which is then deflected to the extension picture element 1. At $t=t_0+\Delta t$ the second picture element of the video is deflected to the extension picture element 2, etc., until at $t=t_0+3\Delta t$ the fourth picture element is deflected to the extension picture element 4. The light source frequency $f_L$, hence, is $f_L=1/\Delta t=K_{res}R=4\ R$.

In the figures the picture element modification means VM contain control means not displayed in greater detail, in which the sequence is stored when the light of the light source L is to be deflected to which extension picture element. The control means are adapted to control the movement of the individual movement elements of the picture element modification means VM according to this sequence. In the case of the realization of the picture element modification means VM by MEMS micro systems this means that the control means generate electrostatic fields and, hence, forces in order to modify the movement elements respectively into the position in correspondence with the sequence.

In FIG. 1(b) there is illustrated a display device A according to the same principle, wherein the picture element modification means VM project the extension picture elements 1, 2, 3 and 4 at other positions around the light source L. By changing the number of extension picture elements, the factor of the resolution increase may, most certainly, also assume other, in particular higher, values than the resolution of $K_{res}=4$.

Figure 2:
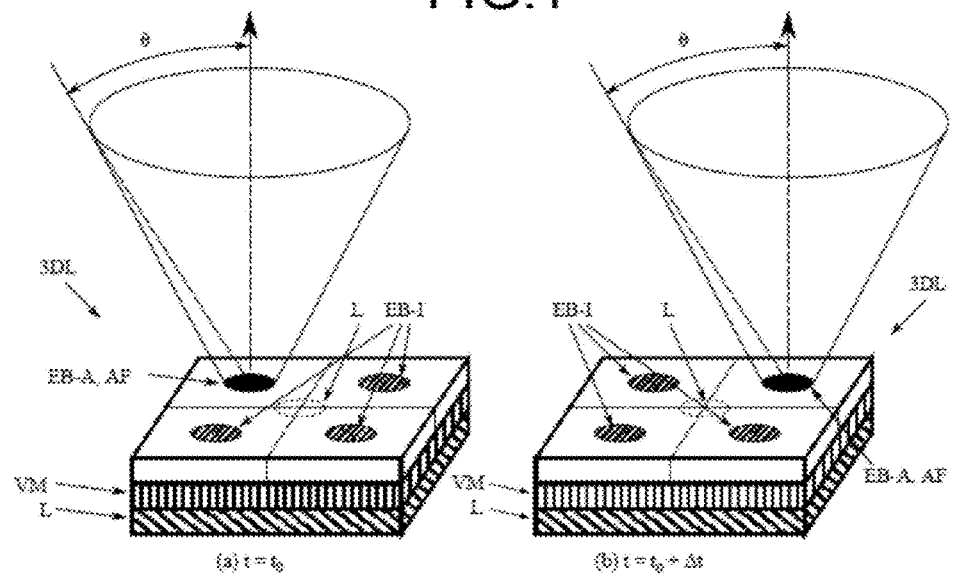

FIG. 2 shows the sequential control of the extension picture elements of FIG. 1(a). At every point of time, there are present one active extension picture element EB-A and three inactive extension picture elements EB-I. The exit area AF of the light is at any time at the site of the active extension picture element. When using resolution increase, there is in general aimed a high divergence θ, in order to obtain a high viewing angle of the display device A.

Figure 3:
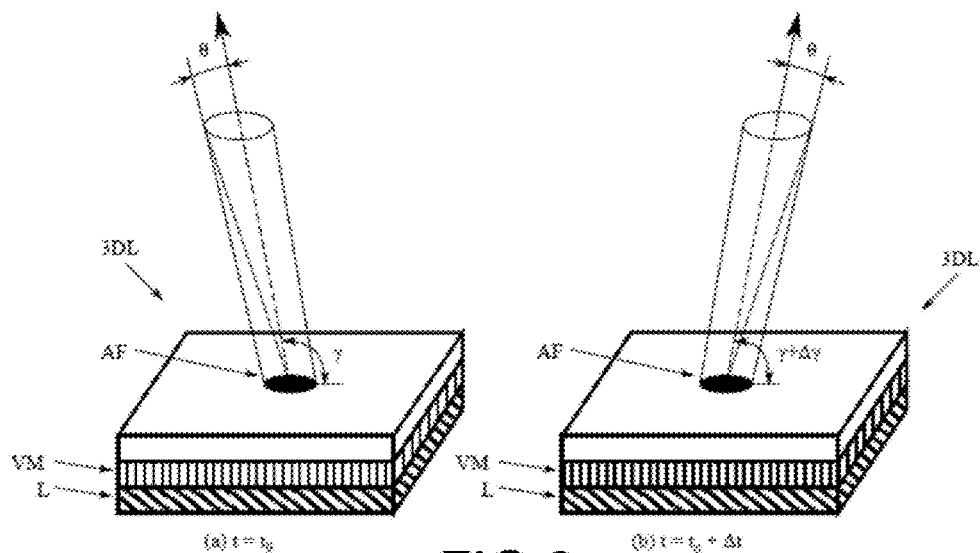
FIG. 3 shows the sequential change of direction of the emitted light beam in the case of the autostereoscopic 3D representation of a picture element.

If there is used the autostereoscopic 3D representation, as depicted in FIG. 3, the exit area AF does not change temporally—there is rather changed the angle γ of the emitted light beam. Another difference to using the resolution increase is that there is herein aimed at a small divergence θ. But also in this application, there are developed extension picture elements, however, only in the far field in the so-called viewing zones. The principle of the autostereoscopic 3D representation will be subsequently explained in greater detail.

Figure 4:
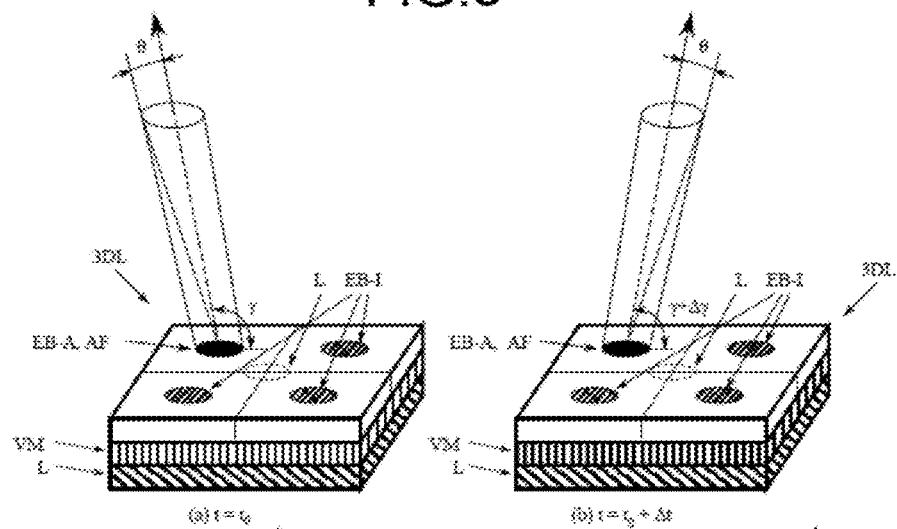
FIG. 4 shows a combination of resolution increase and autostereoscopic 3D representation of a picture element.
Figure 4:
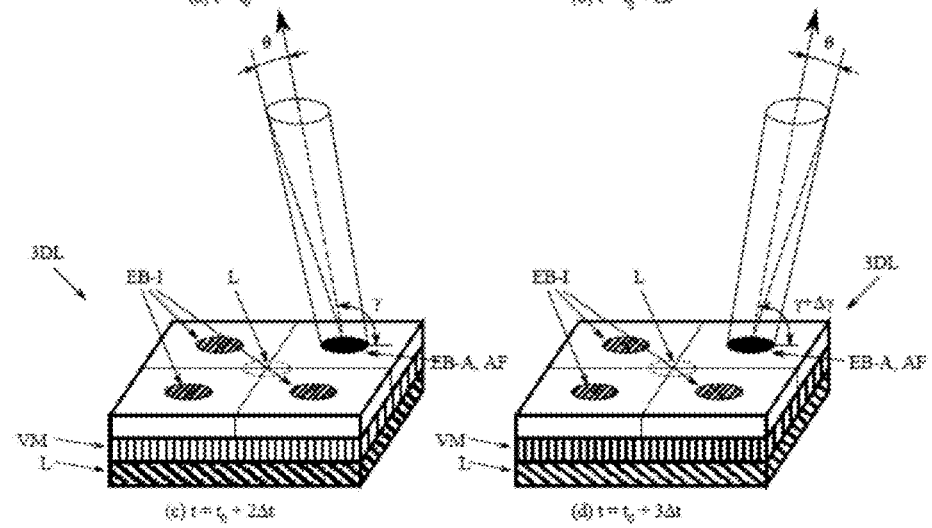

FIG. 4 shows the combination of resolution increase and autostereoscopic 3D representation. At different points of time the exit area AF as well as the angle γ of the emitted light beam change. In this combined application, there are developed extension picture elements at the exit area of the light of the display device for an increase of the resolution, and there are developed additional extension picture elements in viewing zones, which enable the autostereoscopic 3D representation of the image information.

Display Device With Autostereoscopic 3D Representation—Two-View Display

Figure 5:
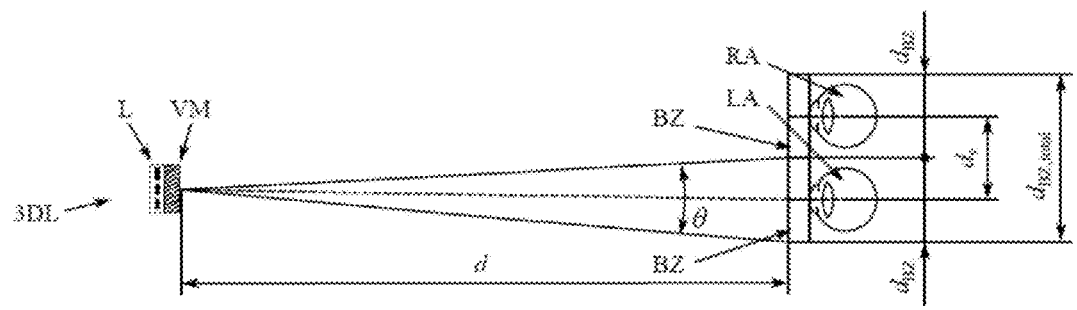
FIG. 5 shows a schematic illustration of a LED light source with three LEDs of the primary colors for an autostereoscopic 3D representation of a picture element of the image information.

FIG. 5 shows a schematic illustration of a light source L with, e.g. three LEDs of the primary colors red, green and blue and picture element modification means VM for an autostereoscopic 3D representation of a picture element of the image information. The average eye distance of a female adult is $d_e=6.3$ cm, that of a male adult is $d_e=6.5$ cm. The diameter $d_{BZ}$ of a so-called viewing zone BZ of an autostereoscopic display device or display, respectively, has to be inevitably smaller than the average eye distance $d_e$ and is in the following assumed as an example as $d_{BZ}=6$ cm. For a distance of, e.g., $d_{LED}=3$ mm between neighboring light sources L (=pixel pitch) and a viewing distance of d=7.5 m, the maximal allowable full divergence angle of the light beam emitted by the individual LED of the light source L including picture element modification means, hence, is $$\theta \approx 2\tan^{-1}\left(\frac{d_{BZ}}{2d}\right) = 8 \text{ mrad.} \qquad (1)$$

Figure 6:
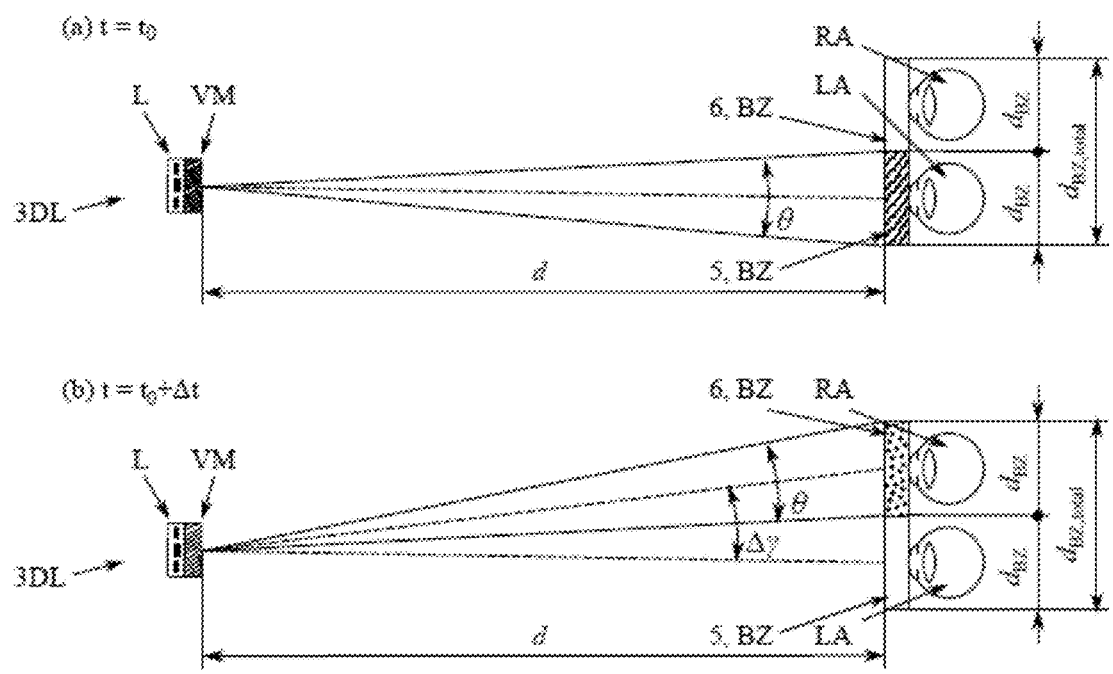
FIG. 6 shows the principle of the autostereoscopic illustration of image information of a picture element.

In FIG. 6 there is depicted the principle of the autostereoscopic illustration of image information. A 3D light source 3DL, consisting of a conventional light source L and the picture element modification means VM, which deflect the image information for the left eye LA and the right eye RA. Herein, there is alternately illustrated the image information for the left eye LA as extension picture element 5 and the image information for the right eye RA as extension picture element 6. The required angle increment Δγ is for the same diameters $d_{BZ}$ of all viewing zones BZ dependent on the geometrical position of the respective viewing zone BZ and, hence, for the above parameter, is approximately constant to $$\Delta\gamma \approx \theta \approx 2\tan^{-1}\left(\frac{d_{BZ}}{2d}\right) = 8 \text{ mrad.} \qquad (2)$$

The light source frequency $f_L$, by means of which the image information of the 3D light source 3DL for the left eye LA, and subsequently for the right eye RA, and then alternately is changed, then is $f_L=1/\Delta t=N_{BZ}R=2\ R$, where in this example the number of the viewing zones $N_{BZ}$ is, according to the number of the eyes of the viewer, two. The principle of the autostereoscopic 3D representation that is depicted in FIG. 6 is realized as a so-called two-view Display, which realizes two viewing zones BZ in the field of the extension picture elements 5 and 6. In order to send the image information at any point of time to the two eyes RA and LA of an individual and optionally moving viewer, there may be used methods like, e.g., head tracking. Herein, there is continuously determined the position of the viewer's head, and the angles of deflection of the picture element modification means VM are correspondingly adapted.

Display Device With Autostereoscopic 3D Representation Multi-View Display

An alternative realization of the autostereoscopic image illustration is the use of more than two viewing zones BZ. Such displays are designated as multi-view displays. As long as the viewer is situated in the viewing area of the width $d_{BZ\ total}$, he/she will be in a position to perceive a stereoscopic image. For in total $N_{BZ}$ viewing zones BZ, each having the width $d_{BZ}$, the entire viewing area is determined as $$d_{BZ\ total}=N_{BZ}d_{BZ} \qquad (1)$$

Multi-view displays do not only generate a stereo parallax, this is different images for both eyes, but rather also a movement parallax, this is, the viewer may move in the area of the width $d_{BZ\ total}$ and get a different view onto the depicted scene from every different angle. Also in a multi-view display application one may in addition use head tracking in order to send 3D image information only into those spatial areas in which there are actually viewers present.

Figure 7:
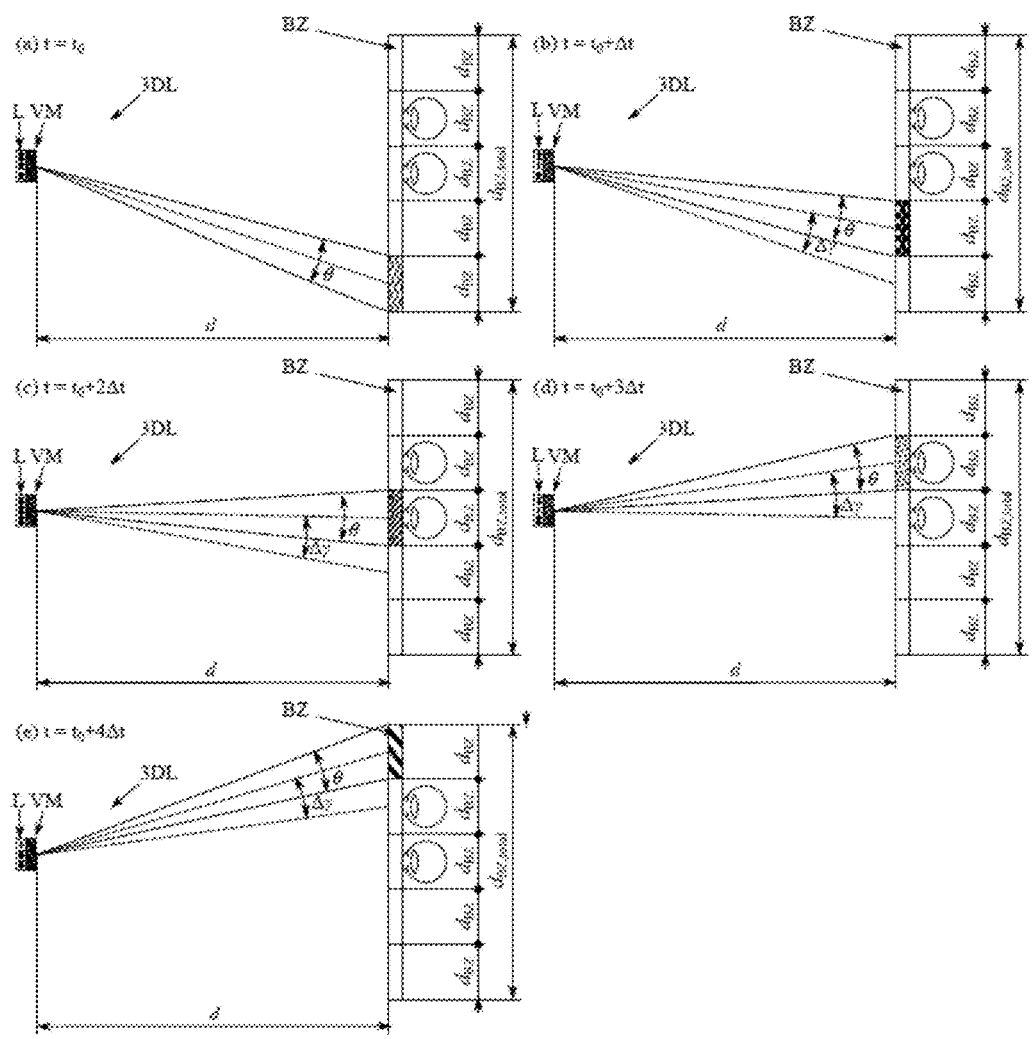
FIG. 7 shows an example of a multi-view display with five viewing zones.

FIG. 7 shows an example of such a multi-view display with $N_{BZ}$=5 viewing zones BZ. In intervals of $\Delta t$ the deflection angle of the picture element modification means VM is incremented by the angle increment $\Delta\gamma$. The angle increment $\Delta\gamma$ depends on the geometrical position of the respective viewing zone, in a sufficiently large viewing distance; however, it may be considered as constant in a first approximation. At any point of time there is outputted another image of the three-dimensional scene (in contrast to merely two different images in the case of a two-view display). In the multi-view display there exist also viewing zones BZ at sites, at which there is not present any viewer at a given point of time. If the number $N_{BZ}$ of viewing zones BZ is sufficiently large, several viewers may simultaneously perceive the autostereoscopic effect, in contrast to the two-view display, wherein only one viewer may perceive the effect. The switch interval $\Delta t$ of the picture element modification means VM is then at a given frame rate R as follows:

$$\Delta t = \frac{1}{RN_{BZ}}. \quad (2)$$

In the multi-view display according to FIG. 7, the switch interval at R=60 s$^{-1}$ is, e.g., $\Delta t \approx 3.33$ ms. The light source frequency $f_L$, at which the image information of the 3D light source 3DL is changed, then is assumed as $f_L=1/\Delta t=N_{BZ}R=5 \cdot R=300$ Hz.

Figure 8:
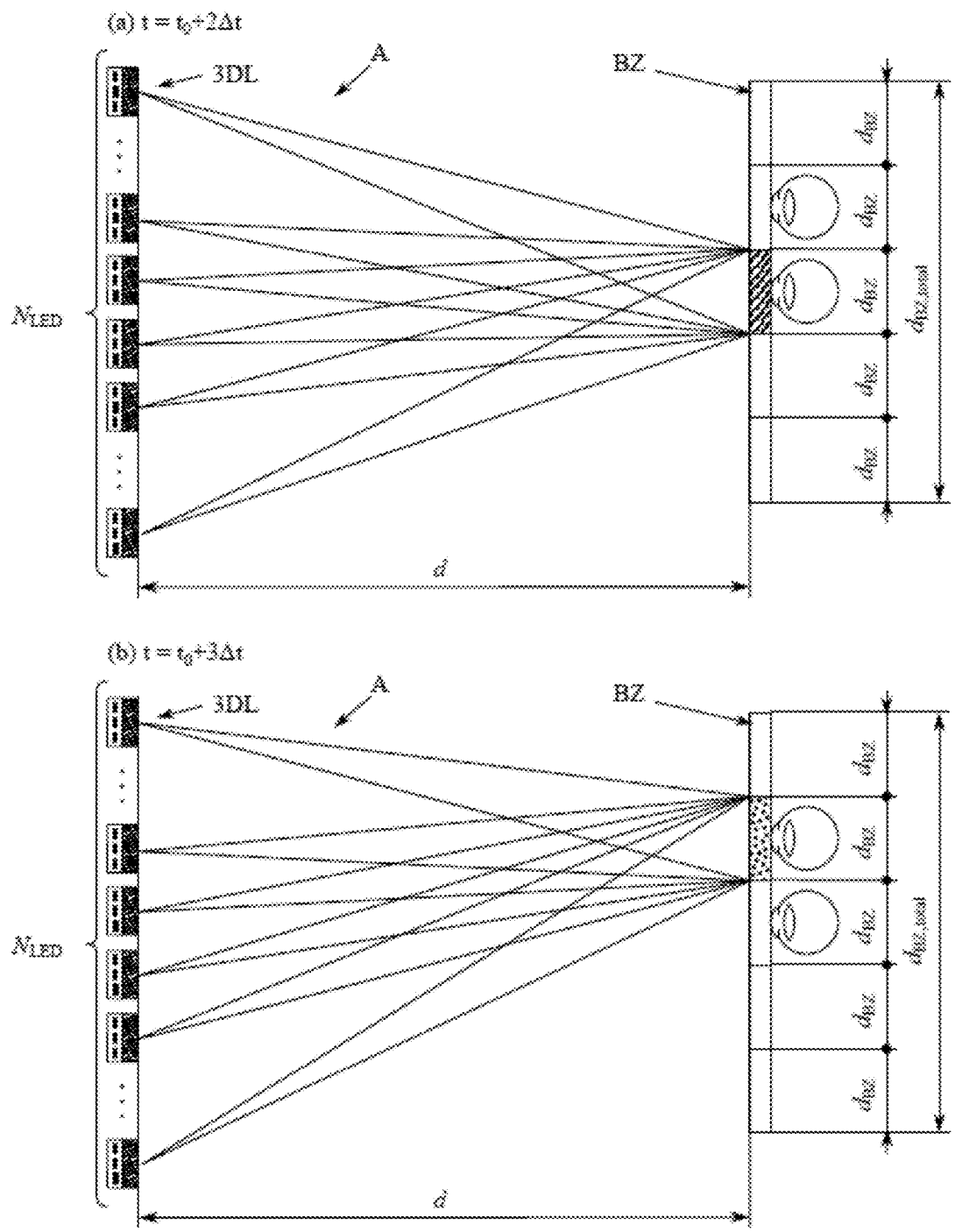
FIG. 8 shows the multi-view display of FIG. 7 with 3D light sources, which display in time intervals image information in viewing zones synchronized in regard to space as well as time.

For reasons of clarity, in the FIGS. 5 to 7 there is only depicted one 3D light source 3DL. FIG. 8 shows the multi-view display of FIG. 7 with in total $N_{LED}$ 3D light sources 3DL, which illustrate in intervals of $\Delta t$ image information in the $N_{BZ}$ viewing zones BZ synchronized in regard to space as well as time. In FIG. 8 there are herein only illustrated the two points of time (a) $t=t_0+2\Delta t$ as well as (b) $t=t_0+3\Delta t$.

Figure 9:
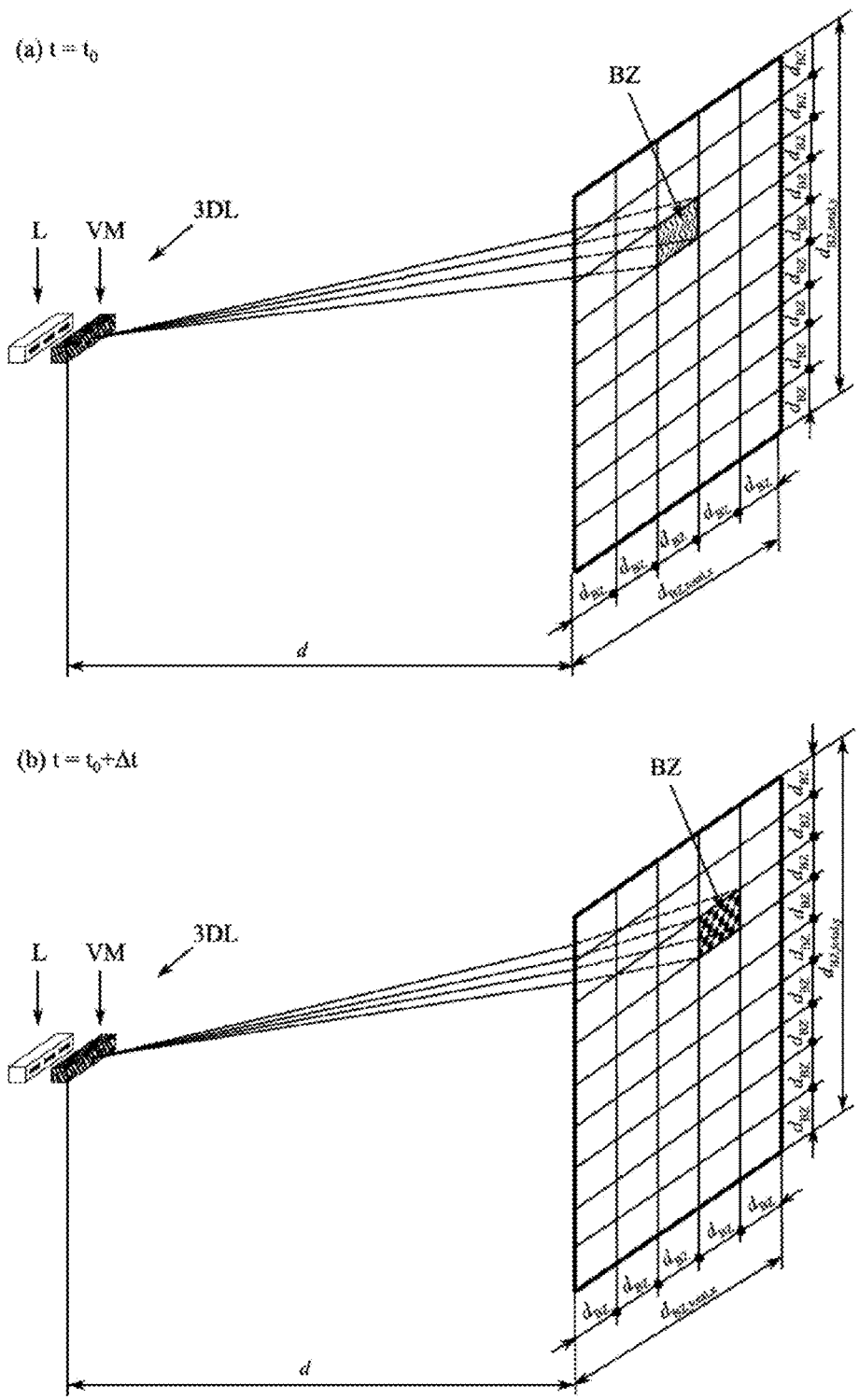
FIG. 9 shows 3D light sources, which generate two-dimensional viewing zones in the far field.

For reasons of clarity, there have been assumed so far only one-dimensional viewing zones. FIG. 9 shows a 3D light source 3DL, which generates in the far field two-dimensional viewing zones BZ. There, the emitted light beam is sequentially deflected by way of the picture element modification means VM horizontally as well as vertically. At $N_{BZ,x}$ viewing zones BZ in the x direction and $N_{BZ,y}$ viewing zones BZ in the y direction, the minimal switch interval is $$\Delta t = \frac{1}{RN_{BZ,x}N_{BZ,y}}. \quad (3)$$

The viewing zones BZ may be different also in number and dimension in the x and y direction.

Figure 10:
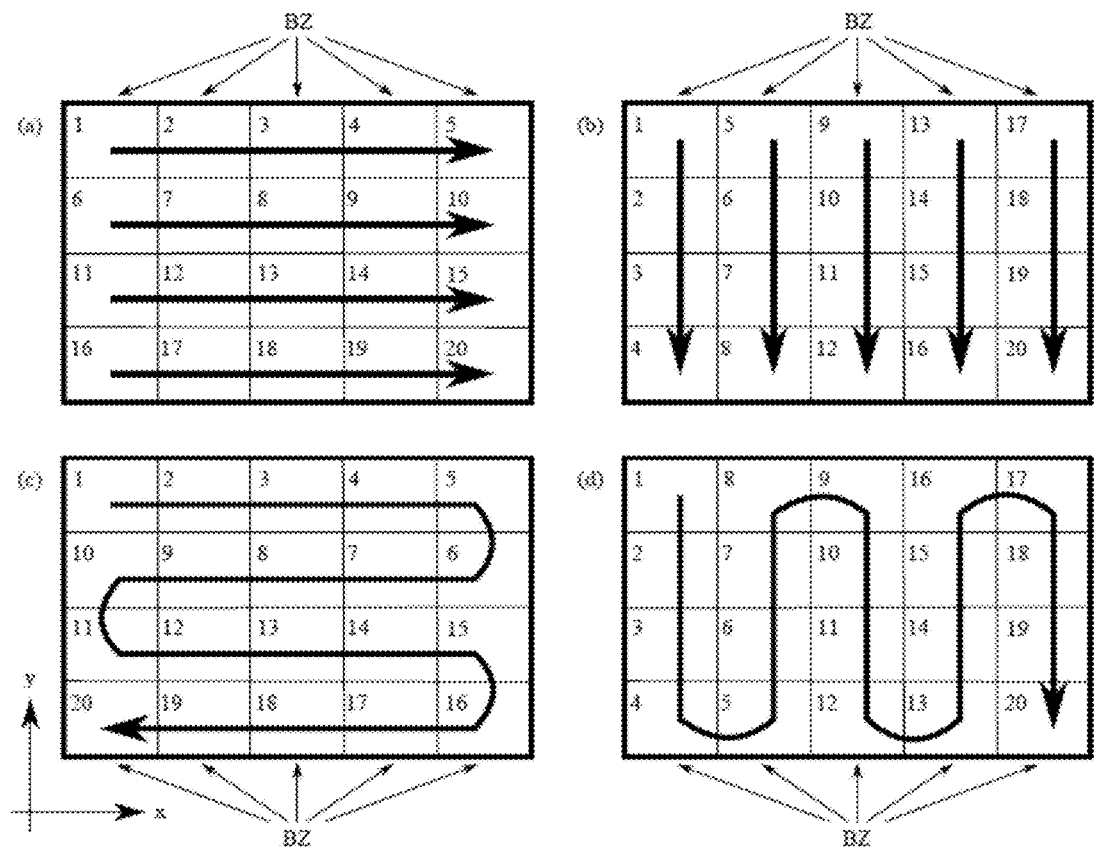
FIG. 10 shows examples of the sequential series of control of the viewing zones of a display device, which is formed by a multi-view display.

FIG. 10 shows examples of the sequential order of control of the viewing zones BZ of a display device A, which is formed by a multi-view 3D display. The picture element modification means VM of the display device A contain, for this reason, control means that are not displayed in FIG. 9 for controlling the movement elements of the picture element modification means VM, which will be explained in greater detail later on. If the control is carried out one line or column, respectively, after the other, the required switch intervals $\Delta t_y$ for lines or $\Delta t_x$ for columns, respectively, will be longer by a factor of $N_{BZ,x}$ or $N_{BZ,y}$, respectively.

In the FIG. 10(a) to (d) examples of the sequential control of $N_{BZ,x} \cdot N_{BZ,y}=5 \cdot 4=20$ viewing zones BZ are illustrated. Table 1 given below lists the required switch intervals for the sequences of FIG. 10. In the meandering sequences of the FIGS. 10(c) and (d) the angle increments are further minimized at the change of line or column, respectively, which is advantageous in the practical realization of the display device A.

TABLE 1

|  | $\Delta t_x$ | $\Delta t_y$ |
|---|---|---|
| FIG. 10(a) | $\dfrac{1}{R N_{BZ,x} N_{BZ,y}}$ | $\dfrac{1}{R N_{BZ,y}}$ |
| FIG. 10(b) | $\dfrac{1}{R N_{BZ,x}}$ | $\dfrac{1}{R N_{BZ,x} N_{BZ,y}}$ |
| FIG. 10(c) | $\dfrac{1}{R N_{BZ,x} N_{BZ,y}}$ | $\dfrac{1}{R N_{BZ,y}}$ |
| FIG. 10(d) | $\dfrac{1}{R N_{BZ,x}}$ | $\dfrac{1}{R N_{BZ,x} N_{BZ,y}}$ |

There is to be noted that other control order sequences than those depicted in FIG. 10 are also possible. There could also be used spiral-like, diagonal or Figures in the type of Lissajous curves, which, e.g., are present when using resonant 2D micro scanner mirrors.

Figure 11:
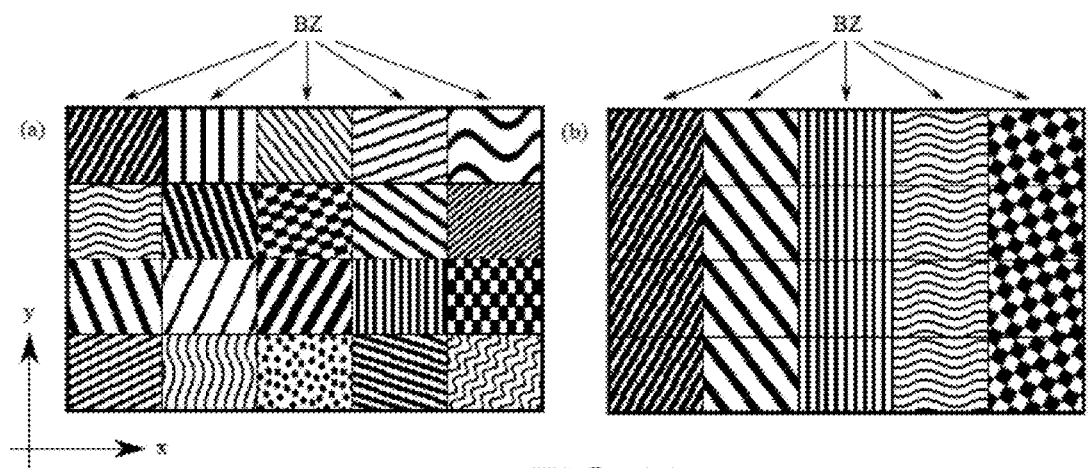
FIG. 11 shows the principle of the reduction of the required number of different image information.

In order to reduce the number of different image information required at constant area, viewing zones BZ of whole columns may illustrate the same image information in a frame of the period $\Delta t=1/R$. FIG. 11 shows the principle of the reduction of the required number of different image information. Different gray values represent different image information, which are illustrated in a viewing zone BZ during the period of a frame, this is in the interval $\Delta t=1/R$. According to FIG. 11(a) there are present different viewing zones BZ of the viewing area, whereas according to FIG. 11(b) there is illustrated the same image information per column. In order of being able to perceive a three-dimensional image, the viewer has to keep the head (approximately) vertically oriented with a scheme like the one in FIG. 11(b).

Elements of the Picture Element Modification Means VM

The elements of the picture element modification means VM may be distinguished into three categories of refractive, reflective and diffractive structures. In FIG. 12, the mechanisms of action of these three categories are illustrated, wherein in FIGS. 12(a), (d) and (g) the refractive elements RE1, in FIGS. 12(b), (e) and (h) the reflective elements RE2 and in FIGS. 12(c), (f) and (i) the diffractive elements DE are illustrated. The elements of the FIG. 12(a) to (c) focus, the elements of the FIG. 12(d) to (f) deflect and the elements of the FIG. 12(g) to (i) split the light beams emitted by the light source L.

Refractive Elements RE1

Refractive elements RE1 act on the optical path by refraction at an interface between two different media according to Snell's law. One possibility to realize refractive elements RE1 is the use of gradient index structures, wherein the refractive index is a function of the lateral coordinates. An alternative possibility is the use of structures with a surface profile, e.g., a conventional lens. In FIG. 13 there are depicted two examples of embodiments of refractive elements RE1 of the picture element modification means VM: (a) plano-convex converging lens and (b) plano-convex Fresnel lens.

Reflective Elements RE2

Reflective elements influence the optical path in pursuance with the laws of reflection.

Diffractive Elements DE

Diffractive elements influence the optical path on the basis of the diffraction on condition of the structure of the element of the picture element modification means VM. In general, the characteristics of diffractive structures are essentially more dependent on the wavelength of the incident light. For this reason, the suitability of using these elements with light of a relatively broad bandwidth like conventional LEDs (e.g., bandwidth B≈30 nm) is limited. In the case of light with a narrow bandwidth like lasers or special LED structures such as, e.g., SLDs or RCLEDs, diffractive elements DE constitute in the majority of cases a cheap alternative to refractive elements RE1 or reflective elements RE2 or may be used as a supplementation thereto, respectively.

Micro Apertures and Micro Shutters

By way of the above described elements of the picture element modification means, micro mirrors as well as micro lenses may be realized. Further elements of the picture element modification means VM may be micro apertures, which may limit the spatial expansion of light beams, as well as micro shutters or micro covers, which may block light or let it pass, according to control.

Improvement of the Characteristics of the Elements of the Picture Element Modification Means VM Reduction of Chromatic Aberration Chromatic aberration is an imaging error of optical (micro) lenses, which is caused by the wavelength dependency of the refractive index of the refractive material, which is also called dispersion. Light of different wavelengths is refracted differently, and thus the lens has different focal lengths for different wavelengths. Chromatic aberration may be reduced by the combination of several lenses of different materials. A green LED, for example, has a FWHM (full width at half maximum) bandwidth of $B \approx \lambda_2 - \lambda_1 = 540$ nm−510 nm=30 nm. If the two wavelengths that differ the most from each other, this is $\lambda_1$ and $\lambda_2$, are combined, this is called an achromatic correction. If further the central wavelength $\lambda_c$ is combined with $\lambda_1$ and $\lambda_2$, this is designated as an apochromatic correction. FIG. 14 schematically shows the functioning principle of (a) chromatic, (b) achromatic and (c) apochromatic correction. The reduction of chromatic aberration also leads to a reduction of the divergence θ of Equation (1).

Reduction of the Rise Distance

In FIG. 15 the intensity I in the distance d from the light source L is illustrated as a function of the lateral coordinate x. In general, the spatial intensity distributions of the individual viewing zones BZ will overlap. An important parameter of the 3D light source 3DL is the so-called rise distance $d_R$, which herein is defined—more or less arbitrarily—as the distance between the two points, where the intensity assumes 10% or 90%, respectively, of the maximum value. The width $d_{BZ}$ of a viewing zone BZ is herein defined as the distance of those two sites, wherein the two spatial intensity distributions of adjacent viewing zones BZ assume the same values.

The rise distance $d_R$ for a sufficient spatial separation may be reduced, e.g., by the so-called beam shaper SF. In the case of diffractive beam shapers, there may be obtained a variety of beam profiles in the far field due to the respective change of amplitude and phase of a spatial coherent beam. In order to reduce the rise distance $d_R$, there may advantageously be used a beam shaper, which generates a so-called top hat beam profile, corresponding to a spatial square function in the far field.

FIG. 16 shows a setup of a 3D light source 3DL, consisting of a light source L, picture element modification means VM as well as a beam shaper SF.

The beam shaper SF acts only in a limited way, similar to diffractive elements DE of the picture element modification means VM, in the case of light with a relatively broad bandwidth as, e.g., of conventional LEDs. Such beam shapers may be used, however, with alternative narrow-band light sources such as, e.g., lasers or special LED structures like SLDs or RCLEDs.

Exemplary Embodiments of Different Picture Element Modification Means VM

Immovable Light Source L With Movable Picture Element Modification Means VM

FIG. 17 shows several exemplary embodiments of an immovable light source L with movable mirrors or reflectors BR, respectively, immovable mirrors or reflectors UR, respectively, as well as lenses LI forming picture element modification means. The examples each show two positions (position 1 at the time $t=t_0$ and position 2 at a later point of time $t=t_0+\Delta t$). By inclining the mirrors in different angles and/or different axes (e.g., vertical and horizontal), there are, however, also possible more than two positions, which then make it possible to realize more than only two extension picture elements.

FIG. 17(a) shows an immovable reflector UR that is arranged in regard to the viewer in front of the light source L and a movable mirror or reflector BR (e.g., micro mirror), respectively, that is arranged behind the light source L, which deflects the light—dependent on the current position of the reflector BR—into two different directions. The sending of the image information of the picture element is carried out, as already mentioned, in the time multiplex method in order to always have available the correct image information for every extension picture element (virtual pixel).

In the FIGS. 17(b) and (c) the picture element modification means are illustrated in an embodiment of reflectors BR, which are similar to a Cassegrain telescope, in order to obtain a better directivity of the emitted light. Also other embodiments, such as, e.g., similar to a reflecting telescope or a periscope (FIG. 17(d), FIG. 17(i) or other forms of reflectors (e.g., retro-reflectors), respectively), may be used. In the FIG. 17(e) to (h) and in FIG. 17(j) there are illustrated a number of embodiments with micro lenses LI.

FIG. 18 shows further exemplary embodiments with immovable light sources L and movable 2D reflectors BR (micro mirrors) as well as immovable lenses LI (micro lenses). The movable 2D reflectors BR may be inclined in two axes that are perpendicular to each other, by means of which the beam emitted by the associated light source L (red light source LED-R, green light source LED-G, blue light source LED-B) may be deflected in two directions. Edge-emitting light sources L are displayed in the FIGS. 18(a) and (c). Surface-emitting light sources L, illustrated in the FIGS. 18(b) and (d), in these embodiments need an additional immovable reflector UR (micro mirror), which deflects the emitted light beam in the horizontal. The picture element modification means VM illustrated in the FIGS. 18(c) and (d) further have transparent windows TF.

FIG. 19 shows exemplary embodiments of the 3D light source 3DL with an element, which combines the three emitted light beams (red, green and blue) (beam combiner SK) and subsequently focuses onto a single movable reflector BR (2D micro mirror). The FIGS. 19(a) and (c) show edge-emitting light sources, the FIGS. 19(b) and (d) show surface-emitting light sources L with additional immovable reflectors UR (micro mirrors) for the deflection of beams in the horizontal.

FIG. 20 shows further exemplary embodiments of a 3D light source 3DL with one movable reflector BR and no beam combiner SK. In FIG. 20(a) the three emitted light beams hit the movable reflector BR in different angles. In the exemplary embodiment of FIG. 20(b), there is used a big movable reflector BR, which reflects all three emitted light beams hitting at the same angle.

Movable Light Source L With Movable Picture Element Modification Means VM

Following FIG. 17, FIG. 21 shows exemplary embodiments, wherein the 3D light source 3DL itself is arranged movable. This means that all elements of the 3D light source 3DL, this is the light source L and optionally inclusive reflectors BR and UR as well as lenses LI, are mounted fixedly in regard to each other, whereas, however, the entire 3D light source 3DL is arranged movable in regard to the screen.

Shutters or Micro Shutters, Respectively, For Covering the Light Beams

FIG. 22 illustrates another possible extension of the concept. Herein, movable (micro) covers or shutters BV and/or movable (micro) reflectors BR, respectively, are used to block light emitted by the light source L. FIG. 22(a) shows an immovable light source L, in front of which there are arranged movable shutters BV, which open and close in the time multiplex method and thus allow for the exit of light from the light source L at different sites. The FIG. 22(b) to (c) are based on the already described telescope setup, wherein parts of the telescope mirrors are also used to block the exit of light at undesired sites. FIG. 22(d) shows a combination of several movable reflectors BR, which are used to deflect the light in the desired direction as well as to block the light at the respective points of time. All these exemplary embodiments may, of course, in addition be combined with other optical elements such as, e.g., lenses.

Alternative Light Sources L

The mentioned light sources L need not necessarily be composed of one or several LEDs. Alternatively, there may also be used other light sources such as, e.g., RCLEDs, SLDs or lasers, or these may be combined with each other. It is also conceivable to couple the light into an optical waveguide, which may also present part of the picture element modification means.

RCLEDs

Resonant-cavity LEDs (RCLEDs) use an optical resonator in order to reduce, in comparison with conventional LEDs, the divergence as well as the bandwidth of the emitted beam of light.

SLDs

In so-called superluminescent LEDs (SLDs or SLEDs) photons, which are emitted through spontaneous emissions, are amplified by stimulated emission (amplified spontaneous emission ASE). SLDs have a substantially smaller temporal coherence than lasers, which is why in the image displayed by the 3D light sources 3DL there are not developed any speckles. "Speckles" is a spot-like spatial intensity distribution of coherent light, which is generated by constructive as well as destructive interference of light. The refractive index in the atmosphere that is changing in regard to space and time due to scintillation may, for example, be a reason for such an interference phenomenon. The bandwidth of the emitted light is smaller than that of conventional LEDs but substantially larger than with lasers. The divergence of the emitted beam of light may be compared to that of lasers. Due to these characteristics, SLDs are especially favorably used as light source of the 3D light source 3DL described herein.

Laser

The above described change of the directivity in the time multiplex method may not only be realized for LEDs but also for (semi-conductor) lasers. Due to the monochromaticity of lasers there may be obtained a lower residual divergence following collimation through a lens LI and, hence, a greater viewing distance at constant width of the viewing zones BZ than with conventional LEDs.

Optical Waveguides

It is also possible to deflect the exit field of an optical waveguide into different directions using a picture element modification means VM in the time multiplex method. In FIG. 23 there is depicted a possible realization, wherein a horizontal displacement device HVE and a vertical displacement device VVE are used in order to exert influence on the direction of the light beam LK emitted out of the waveguide that consists of a waveguide cladding ELM and a waveguide core WLK.

Control

The light sources may either be controlled analogously or by means of pulse width modulation (PWM). A pulse width modulation with N Bit makes it possible to adapt in total $2^N$ different intensity values. The integrated control of one or a plurality of 3D light sources 3DL may, for example, be carried out by means of application-specific integrated circuits (ASIC), field programmable gate arrays (FPGA) or complex programmable logic devices (CPLD).

Alternative Techniques for the Modification of the Directivity

Refractive Index Profile of a Waveguide

When using the output field of an optical waveguide as input field of the picture element modification means VM, the directivity may not only be modified by micro lenses, micro mirrors, micro shutters as well as micro apertures but rather also by a change of the refractive index profile of the waveguide.

Micro-Phased-Array-Antenna

Another possibility to achieve a modification of the directivity at a fine spatial resolution is to use a micro-phased-array-antenna (MPAA), which uses an array of several optical "antennas". The directivity may be changed by changing the relative phase difference of the optical fields, which are emitted by the individual antennas. As defined phase fronts only exist with monochromatic light, the light sources of the individual optical antennas consist of, e.g., (semi-conductor) lasers.

Alternative Applications

Display Device as 3D Breaking Light

Light bulbs in breaking lights of various vehicle types are constantly being substituted for LEDs, as these in general have a longer life as well as higher efficiency. The 3D light source 3DL explained in this document may also be used to display a three-dimensional, autostereoscopic warn symbol, which warns the driver of a vehicle KFZ 2 driving behind a vehicle KFZ 1 by way of the 3D breaking light. In this way, the danger of rear-end collisions may be reduced. For example, the word "ATTENTION", "SLOW", "STOP" but also symbols like "!" could be displayed as autostereoscopic warn symbol as image information.

FIG. 24 schematically shows the mechanism of action of the 3D breaking light BL. A possible implementation may, e.g., adapt the level of the autostereoscopic effect to the breaking force of the driver of vehicle KFZ1. The 3D warn symbol could in this way visually "come towards" the driver of the vehicle KFZ2 in the case of an abrupt breaking incident of the driver of the vehicle KFZ1 as a 3D warn symbol WS. It is also conceivable to attach such a display in other sizes and/or at other positions of a vehicle in order three-dimensionally emit warnings or indications in dependence of the data supplied by the vehicle. According to the exemplary embodiment illustrated in FIG. 24 the 3D warn symbol WS may be emitted by (a) a display composed of 3D light sources in only one breaking light BL or (b) by displays composed of 3D light sources, which are arranged all over the vehicle. Then different viewing zones BZ may be illuminated in the time multiplex by at least one 3D light source. In FIG. 24(b) there is, for example, displayed a viewing zone BZ at the time $t=t_0$ and another at the time $t=t_0+\Delta t$. According to the intensity of the breaking incident, the warn symbol WS of only the one or of both breaking lights BL of the vehicle KFZ1 may be displayed to the driver of the vehicle KFZ2 in the viewing zones BZ.

The 3D effect develops, according to the exemplary embodiment in FIG. 24, in the viewing zones BZ and, hence, is also depending on the distance of the viewer to the vehicle KFZ1. This means that the driver of the vehicle KFZ2 does not see the 3D effect of the warn symbol WS in a great distance of the vehicle KFZ1 to the vehicle KFZ2. Only in a certain distance to the vehicle KFZ1, at which the driver of the vehicle KFZ2 should really absolutely necessarily break, the attention of the driver KFZ2 is caught by the three-dimensional display of the 3D warn symbol WS. The breaking lights BL could adapt the distance of the viewing zones BZ to the vehicle KFZ1 to the velocity of the vehicle KFZ1 and, hence, the safety distance between the vehicles KFZ1 and KFZ2, which is necessary for the speed. In general, the display device may be adapted to change the directivity of the light emitted by the breaking light depending on the conditions of weather, light, surrounding and driving.

Adaptive Smart Lighting

"Smart lighting" is the name of a technology for the wireless optical communication using LEDs. The LEDs are herein frequently used simultaneously as ceiling lighting as well as transmitters of data. Due to a sufficiently quick modulation of the LEDs, the human eye is not able to perceive a temporal change of intensity.

The methods explained in this document in regard to the spatial deflection of light in the time multiplex method allow for the realization of an adaptive focusing, which may increase the receiver performance—and thus the obtainable data rate—as well as the interception security of a smart lighting system.

FIG. 25 shows a comparison of conventional and adaptive smart lighting with several picture element modification means VM. The optical communication takes place between the light source L forming the transmitters SE and a receiver EM, wherein in FIG. 25(b) there are in addition provided picture element modification means VM in order to bundle the light emitted by the light sources L to the receiver EM. In FIG. 25(b) the receiver performance is significantly higher than that in FIG. 25(a), which allows for a communication with a higher data rate. Also hybrid adaptive smart lighting systems may be realized.

FIG. 26 shows that the 3D light sources 1, 4 and 7 are used in order to obtain a homogenous illumination, whereas the 3D light sources 2, 3, 5, 6 and 8 are "focused" on the receiver EM in order to increase the receiver performance "Image information" is in these smart lighting systems understood as marking individual zones of data transfer by emitting different colors or 3D symbols for the user. The colors of the light of the display device A or emitted 3D symbols may herein mark zones, in which the user may place his/her receiver EM1, EM2 or EM3 in order to provide for an optical communication—which also runs via the 3D light sources—with the transmitter SE.

FIG. 27 shows an adaptive smart lighting system with three receivers EM1, EM2 and EM3, which receive in the time multiplex method data from the transmitter SE. At the point of time (a) $t=t_0$, (b) $t=t_0+\Delta t$ and (c) $t=t_0+2\Delta t$ data is transferred to the receiver EM1, EM2 as well as EM3 using the picture element modification means VM. Instead of LEDs there may also be used (semi-conductor) lasers as light sources L ("optical wireless"), which in general provide for data being transferred with a higher data rate. Due to the lower divergence of the laser beams, there may be realized transfer sections that are especially safe against interception.

Exemplary Embodiment of an Individual 3D Light Source

FIG. 28 shows a detailed exemplary embodiment of a 3D light source 3DL with three laser diodes LD (red, green, blue) as light source L. By using the laser diodes LD as light source L, there is achieved the advantage that there are obtained as little as possible residual divergences of the emitted light beams upon collimation through the lens FAC at a given focal length of the collimation optics. The three laser diodes LD are mounted on a common submount SM. The submount SM forms a common mounting base for laser diodes LD as well as photodiodes PD and may optionally be mounted on an additional cooling body (heatsink interface HSI). The submount SM as well as the heatsink interface HSI is made of a material that virtually does not deform upon heating, as the laser diodes LD and the FAC lens FAC have to be positioned exactly relative to each other.

The FAC lens FAC is formed cylindrically as a so-called "fast axis collimator" lens and collimates the light emitted by the laser diodes LD only in a spatial dimension, the so-called "fast axis" FA. In the direction orthogonal to the "fast axis", the so-called "slow axis", the laser beams hit a micro mirror that forms a movement element, in an uncollimated way. In order to keep the residual divergence of the "fast axis" small, the FAC lens FAC may have an aspherical lens profile. In order to prevent reflections, the FAC lens FAC may in addition have an anti-reflection coating.

The submount SM including the heatsink interface HSI and the micro mirror MS are mounted on a common substrate SUB. This substrate may be configured as a "molded interconnect device" MID. With the MID technology, it is possible to directly apply conductor paths and through-connections (vias) by way of different process types (e.g., laser direct structuring or two-component injection molding), which make it possible to connect the contact pads of the electrical and electro-optical components (LD, PD, MS) with contact pads on the bottom side of the 3D light source 3DL. This is advantageous for simply and directly contacting the control electronics at the bottom side.

FIG. 29 schematically shows an integrated RGB light source L, which is composed of three laser diodes LD of the primary colors red, green and blue as well the three associated photodiodes PD. The purpose of the photodiodes PD is the measurement of the optical output at the rear facet of the laser diode LD in order to determine the actual optical output at the front facet. This information is required in order to provide for a well-defined output color by mixing the three primary colors, also at environmental conditions that change. Furthermore, this information is used to guarantee safety for the eyes of the viewer. For this reason, the optical output of the laser diodes LD is continuously measured during the operation of the display device A in order to guarantee that at every point of time this output lies below the maximal allowed value of the optical output. Another function of the photodiodes PD is the compensation of aging effects of the laser diodes LD. The optical output of the laser diodes LD in general decreases with increasing age. By continuously measuring the output through the photodiodes PD, these ageing effects may be compensated for by an appropriately modified control of the laser diodes LD.

The active surfaces of the photodiodes PD may be mounted tilted in regard to the orientation of the light sources with respect to the x- and/or y-axis in order to prevent reflections back into the light sources. Light sources LED-R, LED-G and LED-B as well as photodiodes PD may be mounted together on the submount SM depicted in FIG. 29. This submount SM itself may be mounted on a larger heatsink interface HSI together with the FAC lens FAC. As lenses in general have different refractive indices for different wavelengths and, as a consequence, different focal lengths, it is advantageous to mount the light sources LED-R, LED-G and LED-B in different distances $d_{red}$, $d_{green}$ and $d_{blue}$ to the FAC lens FAC in order to minimize the respective residual divergences upon collimation through the FAC lens FAC. Upon collimation of the fast axis FA (direction of the y-axis) through the FAC lens FAC, there may also be optionally carried out a collimation of the slow axis through a SAC lens SAC ("slow axis collimator"). The micro mirror MS may be embodied as a 1D or 2D micro scanner mirror. The control of the micro mirror may be implemented as open-loop control (this is without measurement and feedback of the actual mechanical inclination angle of the micro mirror) or as closed-loop control (this is with an adaptation of the control to the measured actual mechanical inclination angle of the micro mirror).

Exemplary Embodiment of Resolution Increase

FIG. 30 shows another exemplary embodiment of a 3D light source 3DL with increase of resolution. The light emitted by the light source L is guided by means of movable and/or immovable picture element modification means VM to a lens LI, which deflects the collimated light beam in the direction perpendicular to the lens plane. The lens LI may herein be configured, for example, as a Fresnel lens in order to guarantee a compact size in the direction of the propagation of the light. The beam deflected by the lens LI subsequently hits a diffuser D, which scatters the light with a large divergence angle θ in order to realize a great angular viewing area. On the exit area of the diffuser D, there are thus developed at least two extension picture elements, which are sequentially controlled in the time multiplex method. An arrangement of the extension picture elements is possible in lines and/or columns.

FIG. 31 shows a further exemplary embodiment of a display device A, which is composed of an array with two lines and two columns of 3D light sources 3DL. Each of the 3D light sources 3DL displays extension picture elements in a certain spatially limited area of the entire screen.

Continuous Viewing Zones

FIG. 15 and the exemplary embodiment including a beam shaper according to FIG. 16 explained how the intensity distributions of adjacent viewing zones BZ overlap and how the spatial separation of the image information of adjacent viewing zones BZ may be improved by way of the beam shaper. In conventional technologies for autostereoscopic displays, e.g., based on lenticular lenses or parallax barriers, an increase of the number of viewing zones $N_{BZ}$ inevitably results in a reduction of the effective resolution as well as the effective brightness by the same factor. As the resolution cannot be increased arbitrarily, also the number of the viewing zones BZ is limited. In other words, with constant total width of the autostereoscopic viewing window, the viewing zones BZ cannot be made indefinitely small as desired. In FIG. 32 the ideal spatial separation of the viewing zones BZ in the far field of the video screen is visible. FIG. 33 shows the actually realizable spatial intensity distribution—in general, there are overlappings of the image information of the viewing zones BZ with low intensity I in the respective adjacent viewing zones BZ.

With the display device A according to the invention it is possible for the very first time to implement an autostereoscopic effect without loss of resolution. The widths of the individual viewing zones BZ may further be kept very small through the collimation of the "fast axis" FA of the laser diodes LD also in very large distances. In an especially advantageous exemplary embodiment the movement elements are continuously moved and the displayed image information is synchronously in regard to time continuously changed. The collimation of the fast axis FA in combination with the continuously changing deflection of the micro mirror does not only provide for the realization of a discrete number of viewing zones BZ, as explained above, but rather also substantially any number of continuous viewing zones BZ. Upon control of the light sources, the continuous image information is interpolated preferably by suitable algorithms, as the displayed content between two adjacent viewing zones BZ does not substantially change; here the overlapping is disturbing only to a slight extent. The intensity distribution of a display device according to this concept with continuous viewing zones BZ is schematically illustrated in FIG. 34.

The limit case of infinitesimally small expansion of the laser beam in the far field of the video screen corresponds to an exact and realistic representation of a three-dimensional content with $N_{BZ} \rightarrow \infty$ viewing zones. If the viewer moves along the x direction, there will not be perceived any disturbing transitions between adjacent viewing zones BZ.

Exemplary Embodiment With Enlargement of Viewing Angle

In order to enlarge the angle, within which the viewer may be present in regard to the surface normal of the image wall, there exist several possibilities. A simple solution is to enlarge the maximal mechanical deflection angle of the micro mirrors. As in general for the design of such micro mirrors there has to be taken into account scanning speed, physical dimensions and deflection angle, there is a certain degree of freedom for the enlargement of the maximal mechanical deflection angle at the expense of other potentially unimportant variables.

In order to enlarge the vertical viewing angle there may furthermore be used a two-dimensional micro scanner mirror, which in addition vertically deflects the light emitted by the light sources.

The vertical viewing angle may further be enlarged by the "slow axis" divergence angle of the laser diodes being enlarged by an additional diverging lens. This diverging lens may be present in the optical path in front of or behind the micro mirror, with the latter position being preferred.

Enlargement of the horizontal viewing angle by a diverging lens may also be useful—here, however, also the width of the viewing zones may be enlarged.

Vertical as well as horizontal viewing angles may be enlarged by a diffractive optical element. One possibility of realization is a diffractive beam splitter, which splits an incident beam of light into several beams of light, without significantly increasing the residual divergence. As the diffraction angles of the original beams depend on the wavelength of the light, which is different for red, green and blue, this has to be corrected by a correspondingly modified control.

FIG. 35 shows the schematic setup of an optical system with a beam splitter, which is herein designated as beam splitter BS. The beam of light emitted by a laser diode LD is collimated only in one spatial direction by means of a FAC lens FAC and then hits the beam splitter BS. The beam splitter BS splits the beam collimated in the fast axis (here in the y axis) up into N beams, wherein the residual divergence of the individual beams in the y axis is optimally not or only slightly enlarged. In the slow axis SA (here in the x axis), the beam of light, however, is not collimated by the FAC lens FAC. In the x axis the beam splitter BS substantially fulfils the function of a diverging lens.

FIG. 36 shows the intensity distribution to be obtained with the beam splitter BS in the far field in comparison with that without beam splitter BS. One line in FIG. 36 above becomes several longer lines in the direction of the slow axis SA (here in the x axis) in FIG. 36 underneath.

FIG. 37 shows the temporal movement of the intensity distribution of FIG. 36 for the simple case of only $N_{BZ}=3$ different viewing zones BZ. The displayed image information has to be repeated with a period of $T=N_{BZ} \Delta t=3 \Delta t$ in the scanning direction SR. The concept may obviously be generalized for another number of different viewing zones BZ. By using the beam splitter BS and/or a diverging lens, there is obtained the advantage that the area, in which viewers may be present in front of the display device, may be essentially enlarged.

Curved Autostereoscopic 3D LED Display Device

FIG. 38 shows an exemplary embodiment of a display device A in the form of a curved autostereoscopic screen. If a viewer is present in the fully illuminated zone VBZ, he/she then is able to perceive an autostereoscopic image on the entire screen. If he/she, however, is present in the so-called penumbra (semi-shade zone) HSZ, then he/she may, dependent on his/her position, perceive only parts of the image—a part of the screen will be perceived as black. If the viewer is in the so-called umbra (shade zone) SZ, the entire screen will appear black to him. Due to the concave or convex embodiment of the display device A, there are made possible 3D video representations that are suitable for the individual case.

Multi-Content Display Device

By way of the display device according to the invention, it is also possible to display completely different contents for different viewers. It is, for example, possible that a first viewer watches a football match, whereas a second viewer simultaneously watches a feature film. In this connection it is also possible to display both contents in a three-dimensional way. FIG. 39 shows an exemplary embodiment of a display device according to the invention as a multi-content video screen. Three viewers B1, B2 and B3 each see different image information on the multi-content display A. There are fixedly determined content zones CZ1, CZ2 as well as CZ3, wherein respectively different contents or video contents, respectively, may be perceived. It is especially advantageous to adaptively change the content zones CZ. For example, a movement detector could follow the movement of a viewer, whereupon the display device could change the content zones CZ in such a way that the viewer will always stay with his/her content in his/her content zone, even if he/she moves in front of the display device. The light beams of 2D multi-content video screens may have significantly higher divergence than that of 3D video screens.

Alternative Light Sources

In the above mentioned exemplary embodiments there are listed the following light sources: laser, LED, superluminescent LED, resonant-cavity LED. There is to be noted that there are, for example, the following possibilities to realize a RGB light source with laser diodes:

- 3 direct laser diodes, respectively one LD for red, green and blue.
- At least one color is realized by the effect of the frequency doubling (second harmonic generation SHG).
- At least one color is realized by the effect of the luminescence conversion, which is, for example, described in the document US 2010/0118903 A1.

Background Illumination With a Display Device

The display device A according to the invention may also be used as a background illumination for screens, such as, e.g., liquid crystal displays (LCD). Conventional background illumination of such screens is currently performed either by means of cold cathode fluorescent lamps (CCFL) or by means of light emitting diodes (LED).

If the display device is used with movement elements for background illumination, there is, analogously to the increase of the resolution—the light emitted by the light sources deflected in the time multiplex method to different positions on the screen and then illuminates the screen. Thus it is possible by means of a suitable control of the light sources to selectively illuminate individual areas of the screen in order to obtain a higher contrast value. If the scene to be depicted, for example, contains an object in front of a black background, the background illumination at the positions of the black background may be completely turned off, whereas the positions of the image, at which the object is situated, are illuminated. The image information according to the invention that is displayed in the context of the background illumination, hence, is in general a black-and-white image, wherein also several gray shades are possible. In the case of CCFL background illuminations, the local selective background illumination, however, is not an option, which is why screens with this type of background illumination in general have a significantly worse black level.

Embodiment of the Background Illumination With Laser Diodes

Conventional polychromatic LCD screens use pixels, which are usually subdivided into three sub-pixels. Each of these sub-pixels is provided with a color filter, which is only transparent for a primary color (red, green or blue). The bandwidth of the filter is determined upon evaluation between high color saturation and color fidelity with a low bandwidth as well as a higher brightness of the display with a high bandwidth. With CCFL background illumination, there are given further ageing effects, which adversely affect brightness as well as spectral characteristics.

The combination of LEDs and selective color filters constitutes a significant improvement in comparison with CCFL background illumination. Nevertheless, displays with LED background illumination have a not optimal color saturation and fidelity of the light emitted by the LEDs due to the inherent characteristic of a relatively high bandwidth thereof.

The light emitted by laser diodes has, however, an extremely narrow bandwidth, which theoretically provides for a per definition perfect color saturation and color fidelity.

Another significant advantage of laser diodes as light sources for LCD screens is that the emitted light is polarized. As a LCD cell is composed of two polarizers, the axes of transmission of which are perpendicular to each other, having electrically controllable liquid crystals arranged in-between, about the half of the light power is always lost in the case of unpolarized background illuminations like LEDs or CCFLs. In the case of a background illumination with linear polarized laser light, as it is proposed in this invention, an efficiency of nearly 100% (ratio of light output emitted by the screen and light output emitted by the light sources of the background illumination) is possible.

Embodiment of the Background Illumination With Micro Mirrors

In order to provide for a narrow setup of the background illumination unit and, hence, the screen, it may be advantageous to enlarge the maximal optical deflection angle of the micro mirror by additional refractive, reflective and/or diffractive elements. Examples thereof are diverging lenses or diffraction gratings.

General Annotations

MEMS micro systems are known to the expert, for example, from the expert field of sensor technology, and are, for example, used for the realization of inertial sensors. The use of this MEMS technology is especially advantageous to realize movement elements for deflecting the light of a light source.

There is to be noted that the display device according to the invention may be applied in a variety of different products. By multiplication of the picture elements emitted by the light source through the picture element modification means as well as by way of deflection or bundling, respectively, of the emitted light, it is possible to realize most different new applications.

The invention claimed is:

1. A display device for the display of 2D or 3D image information, which image information includes a plurality of picture elements and may be modified with a frame rate, comprising:
    a plurality of light sources, each light source being configured to emit light modified with at least twice the frame rate, and
    a plurality of picture element modification means, each picture element modification means assigned to a corresponding light source of the plurality of light sources and not to another light source of the plurality of light sources,
    each picture element modification means of the plurality of picture element modification means having a movement element movable with at least the frame rate and adapted to selectively deflect and/or cover the light emitted by the assigned light source, in order to generate per light source at least twice the number of picture elements for the display of the image information,
    wherein a first moveable element of a first picture element modification means of the plurality of picture element modification means is individually and independently movable from a second movement element of a second picture element modification means of the plurality of picture element modification means,
    wherein each picture element modification means has at least one movable mirror that is movable in one direction or in two directions,
    wherein the display device further comprises a control circuit configured to position the movement elements with at least the frame rate into $N_{BZ}$ different deflecting positions for achieving an autostereoscopic 3D effect in $N_{BZ}$ viewing zones at a viewing distance from the display device, wherein $N_{BZ}$ corresponds to the number of viewing zones.

2. The display device according to claim 1, wherein each picture element modification means is configured to deflect the light of its assigned light source in a time multiplexed manner into at least two different directions, and wherein the control circuit is configured to control the picture element modification means in dependence on image information sent to the light sources to generate one picture element of the image information per light source and direction.

3. The display device according to claim 2, further comprising, for each picture element modification means, one extension picture element in each of the different directions said picture element modification means can deflect light into, which extension picture element emits light deflected thereto from an exit area of the extension picture element.

4. The display device of claim 3, wherein said extension picture element diverges the light emitted from its exit area under a divergence angle.

5. The display device according to claim 1, wherein each light source comprises a set of three laser diodes or LEDs of the three primary colors red, green, and blue.

6. The display device according to claim 1, wherein each pair of a light source and an assigned picture element modification means is mounted on a common substrate, the pairs being arranged in an array to form the display device.

7. The display device according to claim 1, wherein the at least one mirror is realized as a micro-electro-mechanical system.

8. The display device according to claim 1, wherein each light source has at least one photodiode for measuring the optical output of the light source.

9. The display device according to claim 8, wherein each light source of the plurality of light sources has at least one laser diode with a front facet and a rear facet, at the rear facet of which the photodiode determines the optical output of the laser diode at the front facet thereof.

10. The display device according to claim 9, wherein the surface normal of the active surface of the photodiode is arranged in a tilted position with respect to the optical axis of the laser diode.

11. The display device according to claim 1, wherein each picture element modification means has at least one micro lens which is arranged in the optical path of the light emitted by the assigned light source.

12. The display device according to claim 11, wherein each light source of the plurality of light sources comprises a set of three laser diodes or LEDs of the three primary colors red, green and blue, and wherein each laser diode or LED has a different distance from the micro lens in order to compensate for the refractive index of the micro lens that is dependent on the wavelength.

13. The display device according to claim 11, wherein the micro lens is formed by a FAC (fast axis collimator) lens.

14. The display device according to claim 1, wherein the picture element modification means have at least one beam splitter and/or a diverging lens for enlarging the viewing area of the display device.

15. The display device according to claim 1, wherein the display device is formed curved in a concave or convex way.

16. A display device for the display of 2D or 3D image information, the image information including a plurality of picture elements and may be modified with a frame rate, the display device comprising:
- a plurality of light sources, each light source configured to emit light modified with at least twice the frame rate, and
- a plurality of movement elements, each movement element associated with a corresponding one of the light sources of the plurality of light sources,
- each movement element movable with at least the frame rate and adapted to selectively deflect and/or cover the light emitted by the associated light source in order to generate per light source at least twice the number of picture elements for the display of the image information,
- wherein a first moveable element of the plurality of movement elements is individually and independently movable from a second movement element of the plurality of movement elements,
- wherein each movement element includes at least one movable mirror that is movable in at least one direction,
- wherein the display device further comprises a control circuit configured to position the movement elements with at least the frame rate into $N_{BZ}$ different deflecting positions for achieving an autostereoscopic 3D effect in $N_{BZ}$ viewing zones at a viewing distance from the display device, wherein $N_{BZ}$ corresponds to the number of viewing zones.

17. The display device according to claim 16, wherein each movement element is configured to deflect the light of the associated light source in a time multiplexed manner into at least two different directions, and wherein the control circuit is configured to control the plurality of movement elements in dependence on image information sent to the light sources to generate one picture element of the image information per light source and direction.

18. The display device according to claim 17, further comprising, for each movement element, one extension picture element in each of the different directions said movement element can deflect light into, which extension picture element emits light deflected thereto from an exit area of the extension picture element.

19. The display device according to claim 16, wherein each light source has at least one photodiode for measuring the optical output of the light source.

* * * * *